United States Patent
Bradbury et al.

(10) Patent No.: US 12,079,658 B2
(45) Date of Patent: Sep. 3, 2024

(54) DETECTION OF INVALID MACHINE-SPECIFIC DATA TYPES DURING DATA CONVERSION

(71) Applicant: INTERNATIONAL BUSINESS MACHINES CORPORATION, Armonk, NY (US)

(72) Inventors: Jonathan D. Bradbury, Poughkeepsie, NY (US); Laith M. AlBarakat, Wappingers Falls, NY (US); Timothy Slegel, Staatsburg, NY (US); Andrew M. Sica, Oxford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 555 days.

(21) Appl. No.: 17/350,450

(22) Filed: Jun. 17, 2021

(65) Prior Publication Data

US 2022/0405123 A1  Dec. 22, 2022

(51) Int. Cl.
*G06F 9/48* (2006.01)
*G06F 9/455* (2018.01)
(Continued)

(52) U.S. Cl.
CPC ........ *G06F 9/4856* (2013.01); *G06F 9/45558* (2013.01); *G06F 16/258* (2019.01); *G06F 2009/4557* (2013.01); *G06N 3/063* (2013.01)

(58) Field of Classification Search
CPC .. G06F 9/4856; G06F 16/258; G06F 9/45558; G06F 2009/4557; G06N 3/063
See application file for complete search history.

(56) References Cited

U.S. PATENT DOCUMENTS 5,761,105 A  6/1998  Goddard et al.
5,862,067 A  1/1999  Mennemeier
(Continued)

FOREIGN PATENT DOCUMENTS

CN   112711440 A    4/2021
EP    3736692 A1   11/2020
(Continued)

OTHER PUBLICATIONS

IBM, "z/Architecture—Principles of Operation," IBM Publication No. SA22-7832-12, Thirteenth Edition, Sep. 2019, pp. 1-2000.
(Continued)

*Primary Examiner* — Wissam Rashid
(74) *Attorney, Agent, or Firm* — Edward J. Wixted, III, Esq.; Blanche E. Schiller, Esq.; Heslin Rothenberg Farley & Mesiti P.C.

(57) ABSTRACT

A conversion operation is performed which includes a plurality of conversion actions. A conversion action includes processing an instruction to convert selected data from a source data type to a target data type. The processing includes determining whether a data type indicated using the instruction is a valid data type for a select machine. The data type is a selected data type selected from the source data type or the target data type. The selected data is converted from the source data type to the target data type, based on determining that the data type is a valid data type for the select machine. An indicator is set to a select value to indicate the data type is an invalid data type, based on determining that the data type is an invalid data type for the select machine. The indicator is checked at an end of the conversion operation.

25 Claims, 19 Drawing Sheets

(51) Int. Cl.
*G06F 16/25* (2019.01)
*G06N 3/063* (2023.01)

(56) References Cited

U.S. PATENT DOCUMENTS

| | | | |
|---|---|---|---|
| 6,058,410 A | 5/2000 | Sharangpani | |
| 6,263,426 B1 | 7/2001 | Abdallah et al. | |
| 8,291,003 B2 | 10/2012 | Boersma et al. | |
| 9,600,345 B1 | 3/2017 | Cropper et al. | |
| 9,836,691 B1 | 12/2017 | Narayanaswami et al. | |
| 9,940,101 B2 | 4/2018 | Ahmed et al. | |
| 9,959,498 B1 | 5/2018 | Narayanaswami et al. | |
| 10,185,708 B2 | 1/2019 | Miller et al. | |
| 10,204,093 B2 | 2/2019 | Miller et al. | |
| 10,338,925 B2 | 7/2019 | Flowers et al. | |
| 10,379,814 B2 | 8/2019 | Ahmed et al. | |
| 10,387,366 B2 | 8/2019 | Henry et al. | |
| 10,460,230 B2 | 10/2019 | Brothers et al. | |
| 10,552,199 B2 | 2/2020 | Franciosi | |
| 10,558,588 B2 | 2/2020 | Rozas et al. | |
| 10,558,599 B2 | 2/2020 | Staudenmaier et al. | |
| 10,620,951 B2 | 4/2020 | Azizi et al. | |
| 10,623,386 B1 | 4/2020 | Bernat et al. | |
| 10,642,835 B2 | 5/2020 | Orad et al. | |
| 10,656,913 B2 | 5/2020 | Mueller et al. | |
| 10,699,465 B1 | 6/2020 | Surti et al. | |
| 10,726,328 B2 | 7/2020 | Ling et al. | |
| 10,726,329 B2 | 7/2020 | Lie et al. | |
| 10,728,169 B1 | 7/2020 | McClenahan et al. | |
| 10,778,707 B1 | 9/2020 | Rastogi | |
| 10,789,402 B1 | 9/2020 | Vemuri et al. | |
| 10,802,992 B2 | 10/2020 | Yu et al. | |
| 10,810,484 B2 | 10/2020 | Xie et al. | |
| 10,817,042 B2 | 10/2020 | Desai et al. | |
| 10,824,939 B2 | 11/2020 | Fang et al. | |
| 10,832,137 B2 | 11/2020 | Baker et al. | |
| 10,832,139 B2 | 11/2020 | Yan et al. | |
| 10,860,315 B2 | 12/2020 | Malladi et al. | |
| 10,885,277 B2 | 1/2021 | Ravi et al. | |
| 10,891,538 B2 | 1/2021 | Dally et al. | |
| 2001/0016902 A1 | 8/2001 | Abdallah | |
| 2011/0107327 A1* | 5/2011 | Barkie | G06F 8/63 707/769 |
| 2014/0019713 A1 | 1/2014 | Ould-Ahmed-Vall | |
| 2014/0059542 A1 | 2/2014 | Ashok et al. | |
| 2017/0262307 A1* | 9/2017 | Venkatesh | G06F 16/1794 |
| 2018/0046913 A1 | 2/2018 | Yu et al. | |
| 2018/0322386 A1 | 11/2018 | Sridharan et al. | |
| 2018/0341483 A1 | 11/2018 | Fowers et al. | |
| 2019/0042241 A1 | 2/2019 | Akin | |
| 2019/0079762 A1* | 3/2019 | Heinecke | G06F 9/30014 |
| 2019/0079885 A1 | 3/2019 | Staudenmaier et al. | |
| 2019/0095212 A1 | 3/2019 | Yang | |
| 2019/0147323 A1 | 5/2019 | Li et al. | |
| 2019/0205737 A1 | 7/2019 | Bleiweiss et al. | |
| 2019/0213005 A1 | 7/2019 | Temam et al. | |
| 2019/0324759 A1 | 10/2019 | Yang et al. | |
| 2019/0340499 A1 | 11/2019 | Burger et al. | |
| 2019/0384370 A1 | 12/2019 | Kim et al. | |
| 2020/0005143 A1 | 1/2020 | Zamora Esquivel et al. | |
| 2020/0042860 A1 | 2/2020 | Sun et al. | |
| 2020/0074293 A1 | 3/2020 | Chin et al. | |
| 2020/0104287 A1 | 4/2020 | Regev | |
| 2020/0117369 A1 | 4/2020 | Pelster et al. | |
| 2020/0193274 A1 | 6/2020 | Darvish Rouhani et al. | |
| 2020/0218985 A1 | 7/2020 | Wei et al. | |
| 2020/0242189 A1 | 7/2020 | Chatterjee et al. | |
| 2020/0264876 A1 | 8/2020 | Lo et al. | |
| 2020/0285933 A1 | 9/2020 | Zhang | |
| 2020/0310761 A1 | 10/2020 | Rossi et al. | |
| 2020/0349094 A1 | 11/2020 | Smith et al. | |
| 2020/0387772 A1 | 12/2020 | Zheng et al. | |
| 2020/0401350 A1 | 12/2020 | Kannan et al. | |
| 2020/0401873 A1 | 12/2020 | Lin et al. | |
| 2020/0410327 A1 | 12/2020 | Chinya et al. | |
| 2020/0410337 A1 | 12/2020 | Huang et al. | |
| 2021/0004668 A1 | 1/2021 | Moshovos et al. | |
| 2021/0011846 A1 | 1/2021 | Venkatesh et al. | |
| 2021/0019618 A1 | 1/2021 | Ross et al. | |

FOREIGN PATENT DOCUMENTS

| | | |
|---|---|---|
| KR | 20190086669 A | 7/2019 |
| TW | 202117534 A | 5/2021 |
| WO | WO9825201 A1 | 6/1998 |
| WO | WO2018080617 A1 | 3/2018 |
| WO | WO2018112345 A | 6/2018 |
| WO | WO2018112345 A1 | 6/2018 |
| WO | WO2018125250 A1 | 7/2018 |
| WO | WO2019140067 A2 | 8/2019 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Anonymous, "Method and Circuit for Implementing Hyperbolic Tangent Activation Function in Neural Network Accelerators," IPCOM000254761D, Jul. 30, 2018, pp. 1-2 (+ cover).

Anonymous, "Determining Priority Value of Processes Based on Usage History," IPCOM000252344D, Jan. 5, 2018, pp. 1-38 (+ cover).

Gao, Chang et al., "EdgeDRNN: Recurrent Neural Network Accelerator for Edge Inference," IEEE Journal on Emerging and Selected Topics in Circuits and Systems, vol. 10, No. 4, Dec. 2020, pp. 419-432.

Agrawal, Ankur et al., "DLFloat: A 16-b Floating Point Format Designed For Deep Learning Training and Interference," 2019 IEEE 26th Symposium on Computer Arithmetic (ARITH), Jun. 2019, pp. 1-23.

Chen et al.; "Eyriss v2: A Flexible Accelerator For Emerging Deep Neural Networks On Mobile Devices", Cornell University Library, arXiv:1807.07928v2, pp. 1-21, May 20, 2019.

Eldridge et al.; "Towards General-Purpose Neural Network Computing", Harvard Library, PACT'15 International Conference On, pp. 1-15, Oct. 18-21, 2015.

Han et al.; "Accelerating Event Detection With DGCNN And FPGAs", Electronics, vol. 9, Issue 10, pp. 1-19, Oct. 13, 2020.

Sen et al.; "SPARCE: Sparsity Aware General Purpose Core Extension To Accelerate Deep Neural Networks", Cornell University Library, arXiv:1711.06351v2, pp. 1-13, Nov. 29, 2017.

Wu et al.; "A Reconfigurable Convolutional Neural Network-Accelerated Coprocessor Based On RISC-V Instruction Set", Electronics, vol. 9, Issue 6, pp. 1-19, Jun. 16, 2020.

Anonymous, "Automatically Scaling Multi-Tenant Machine Learning," IPCOM000252098D, Dec. 15, 2017, pp. 1-34 (+ cover).

Edelen, A.L. et al., "Neural Networks for Modeling and Control of Particle Accelerators," IEEE Transactions on Nuclear Science, vol. 63, Issue 2, Apr. 2016, pp. 1-21.

Guo, Kaiyuan et al., "A Survey of FPGA Based Neural Network Accelerator," Dec. 24, 2017, pp. 11:1-11:22.

Ming, Andre Xian et al., "Hardware Accelerators for Recurrent Neural Networks on FPGA," 2017 IEEE International Symposium on Circuits and Systems (ISCAS), May 28, 2017, pp. 1-4.

Schabel, Joshua Chris, "Design of an Application-Specific Instruction Set Processor for the Sparse Neural Network Design Space," 2018 (no further date information available), pp. 1-270.

Yuksel, Kivanc et al., "Deep Alignment Network: from MIMD to SIMD Platform," Oct. 2018, pp. 1-9.

Zhu, Maohua et al., "Taming Unstructured Sparsity on GPUs via Latency-Aware Optimization," Jan. 2020, pp. 1-6.

Allen-Bradley, "Converting PLC-5 or SLC 500 Logic to Logix-Based Logic—Reference Manual," Publication No. 1756-RM085B-EN-P, Nov. 2001, pp. 1-80.

Anonymous, "Datatype Translation in the Presence of Static and Dynamic Types and Untyped Data," IPCOM000185632D, Jul. 29, 2009, pp. 1-5 (+ cover).

(56) References Cited

OTHER PUBLICATIONS

Anonymous, "High Performance Data Format Conversion Using Semantic Mapping Model and Canonical Data Formats," IPCOM000125715D, Jun. 14, 2005, pp. 1-4 (+ cover).
Anonymous, "Intrinsic and Hardware Instruction Format and the Handling Thereof, for Sine, Cosine and Sincos Functions with User Defined Accuracy," IPCOM000239915D, Dec. 2014, p. 1 (+ cover).
Chen, Dongdong et al., "A 32-Bit Decimal Floating-Point Logarithmic Converter," Jun. 2009, pp. 1-10 (+ cover).
Amonymous, "Live Virtual Machine Migration Across Hypervisor Systems By Leveraging the Commonality in Memory Contents of To-Be Migrated VM and of VMs Hosted on Destination Hypervisor," IPCOM000217990D, May 15, 2012, pp. 1-2 (+ cover).
Bafna, Mukesh, "Method and Apparatus to Generically Detect Use Cases Like Live Migration of Vitual Machine," IPCOM000230880D, Sep. 17, 2013, pp. 1-4 (+cover).
Informatica, "The Five Pitfalls of Data Migration—and How to Avoid Them," Jun. 2010, pp. 1-16.
Reid-Miller, Margaret, "Primitive Data Types," Summer 2010 (no further date information available), pp. 1-24.
Anonymous, "Identifying and Determining Trustworthiness of a Machine-Learned Model," IPCOM000252359D, Jan. 2018, pp. 1-34 (+ cover).
Guo, Wanwu et al., "A Neural Network-Based Data Managing and Manipulating System," School of Computer and Information Science, (No Date Information Available), pp. 1-6.
Kuang, Hongyu et al., "Automated Data-Processing Function Identification Using Deep Neural Network," College of Electronic Science, National University of Defense Technology, vol. 4, 2016 (no further date information available), pp. 1-14.
Smieja, Marek et al., "Processing of Missing Data by Neural Networks," 32$^{nd}$Conference on Neural Information Processing Systems, Dec. 2018, pp. 1-11.
Guo, Cong et al., "Balancing Efficiency and Flexibility for DNN Acceleration via Temporal GPU—Systolic Array Integration," Jan. 2020, pp. 1-6.
Dhillon, et al., "Determining Priority Value of Processes Based on Usage History," IPCOM000252344D, Jan. 5, 2018, pp. 1-38 (+ cover).
Zhao, Tian et al., "Serving Recurrent Neural Networks Efficiently with a Spatial Accelerator," Sep. 26, 2019, pp. 1-12.

Anonymous, "Human-Style Text Parsing System," IPCOM000254954D, Aug. 16, 2018, pp. 1-12 (+ cover).
Shawahna, Ahmad et al., "FPGA-based Accelerators of Deep Learning Networks for Learning and Classification: A Review," IEEE Access, vol. 4, 2016 (no further date information available), pp. 1-41.
Anonymous, "Efficient Accelerators for Matrix Multiplication in Machine Learning," IPCOM000243676D, Oct. 9, 2015, pp. 1-3 (+ cover).
Anonymous, "Register Allocation for a RegX Accelerator that Supports Multi-Register Resets," IPCOM000219037D, Jun. 18, 2012, pp. 1-2 (+ cover).
Mittal, Sparsh et al., "A Survey of Encoding Techniques for Reducing Data-Movement Energy," Journal of Systems Architecture, Nov. 2018, pp. 1-38.
Sato, Shimpei, et al., "BRein Memory: A Single-Chip Binary/Ternary Reconfigurable in-Memory Deep Neural Network Accelerator Achieving 1.4 TOPS at 0.5 W," IEEE Journal of Solid-State Circuits, vol. 53, No. 4, Apr. 2018, pp. 983-994.
Cai, Chenghao et al., "Deep Neural Networks with Multistate Activation Functions," Hindawi Publishing Corporation, Computational Intelligence and Neuroscience, vol. 2015, Article ID 721367, Aug. 2015, pp. 1-10.
Gao, Chang et al., "DeltaRNN: A Power-efficient Recurrent Neural Network Accelerator," University of Zurich—Zurich Open Repository and Archive, Feb. 2018, pp. 21-30.
Kang, Hyeong-Ju, "Accelerator-Aware Pruning for Convolutional Neural Networks," IEEE Transactions on Circuits and Systems for Video Technology, vol. 30, Issue 7, Jul. 2020, pp. 1-11.
Nanni, Loris et al., "Stochastic Selection of Activation Layers for Convolutional Neural Networks," Sensors, Mar. 14, 2020, pp. 1-15.
Albarakat et al., "Data Conversion To/From Selected Data Type With Implied Rounding Mode," U.S. Appl. No. 17/350,418, filed Jun. 17, 2021, pp. 1-111.
List of IBM Patents or Patent Applications Treated As Related, Jul. 14, 2021, 2 pages.
Notification of Transmittal of the International Search Report and The Written Opinion of the International Searching Authority, PCT/EP2022/066224, Oct. 5, 2022, pp. 1-10.
Examination Report No. 1 for Standard Patent Application, Application No. 2022292887, May 27, 2024, pp. 1-3.

\* cited by examiner

NEURAL NETWORK
PROCESSING ASSIST 600

GENERAL REGISTER 0

614

| CODE (DEC) | CODE (HEX) | FUNCTION | PARAMETER BLOCK SIZE (BYTES) |
|---|---|---|---|
| 0 | 0 | NNPA - QAF | 256 |
| 16 | 10 | NNPA - ADD | 4096 |
| 17 | 11 | NNPA - SUB | 4096 |
| 18 | 12 | NNPA - MUL | 4096 |
| 19 | 13 | NNPA - DIV | 4096 |
| 20 | 14 | NNPA - MIN | 4096 |
| 21 | 15 | NNPA - MAX | 4096 |
| 32 | 20 | NNPA - LOG | 4096 |
| 33 | 21 | NNPA - EXP | 4096 |
| 49 | 31 | NNPA - RELU | 4096 |
| 50 | 32 | NNPA - TANH | 4096 |
| 51 | 33 | NNPA - SIGMOID | 4096 |
| 52 | 34 | NNPA - SOFTMAX | 4096 |
| 64 | 40 | NNPA - BATCHNORM | 4096 |
| 80 | 50 | NNPA - MAXPOOL2D | 4096 |
| 81 | 51 | NNPA - AVGPOOL2D | 4096 |
| 96 | 60 | NNPA - LSTMACT | 4096 |
| 97 | 61 | NNPA - GRUACT | 4096 |
| 112 | 70 | NNPA - CONVOLUTION | 4096 |
| 113 | 71 | NNPA - MATMUL-OP | 4096 |
| 114 | 72 | NNPA - MATMUL-OP-BCAST23 | 4096 |

FIG. 6C

GENERAL REGISTER 1

| PARAMETER BLOCK ADDRESS |
|---|

PARAMETER BLOCK - QUERY FUNCTION

| | |
|---|---|
| INSTALLED FUNCTIONS VECTOR | ~632 |
| INSTALLED PARAMETER BLOCK FORMATS VECTOR | ~634 |
| 636~ INSTALLED DATA TYPES | INSTALLED DATA LAYOUT FORMATS ~638 |
| MAXIMUM DIMENSION INDEX SIZE | ~640 |
| MAXIMUM TENSOR SIZE | ~642 |
| INSTALLED NNP-DATA-TYPE-1-CONVERSIONS VECTOR | ~644 |

FIG. 6E

PARAMETER BLOCK - NON-QUERY FUNCTIONS                                    650

| 652 | PARAMETER BLOCK VERSION NUMBER | MODEL VERSION NUMBER 654 | CONTINUATION FLAG | 656 |
|---|---|---|---|---|
| | FUNCTION-SPECIFIC-SAVE-AREA-ADDRESS ||| 658 |
| | OUTPUT TENSOR DESCRIPTOR 1 ||| 660 |
| | OUTPUT TENSOR DESCRIPTOR 2 ||| |
| | INPUT TENSOR DESCRIPTOR 1 ||| 665 |
| | INPUT TENSOR DESCRIPTOR 2 ||| |
| | INPUT TENSOR DESCRIPTOR 3 ||| |
| | FUNCTION-SPECIFIC-PARAMETER 1 | FUNCTION-SPECIFIC-PARAMETER 2 || 670 |
| | FUNCTION-SPECIFIC-PARAMETER 3 | FUNCTION-SPECIFIC-PARAMETER 4 || |
| | FUNCTION-SPECIFIC-PARAMETER 5 | || |
| | CONTINUATION STATE BUFFER ||| 675 |

FIG. 6F

TENSOR DESCRIPTOR                                    660, 665

| 682 | DATA LAYOUT FORMAT | DATA TYPE | 684 |
|---|---|---|---|
| | DIMENSION-4 INDEX SIZE | DIMENSION-3 INDEX SIZE | 686 |
| | DIMENSION-2 INDEX SIZE | DIMENSION-1 INDEX SIZE | |
| | TENSOR ADDRESS || 688 |

FIG. 6G

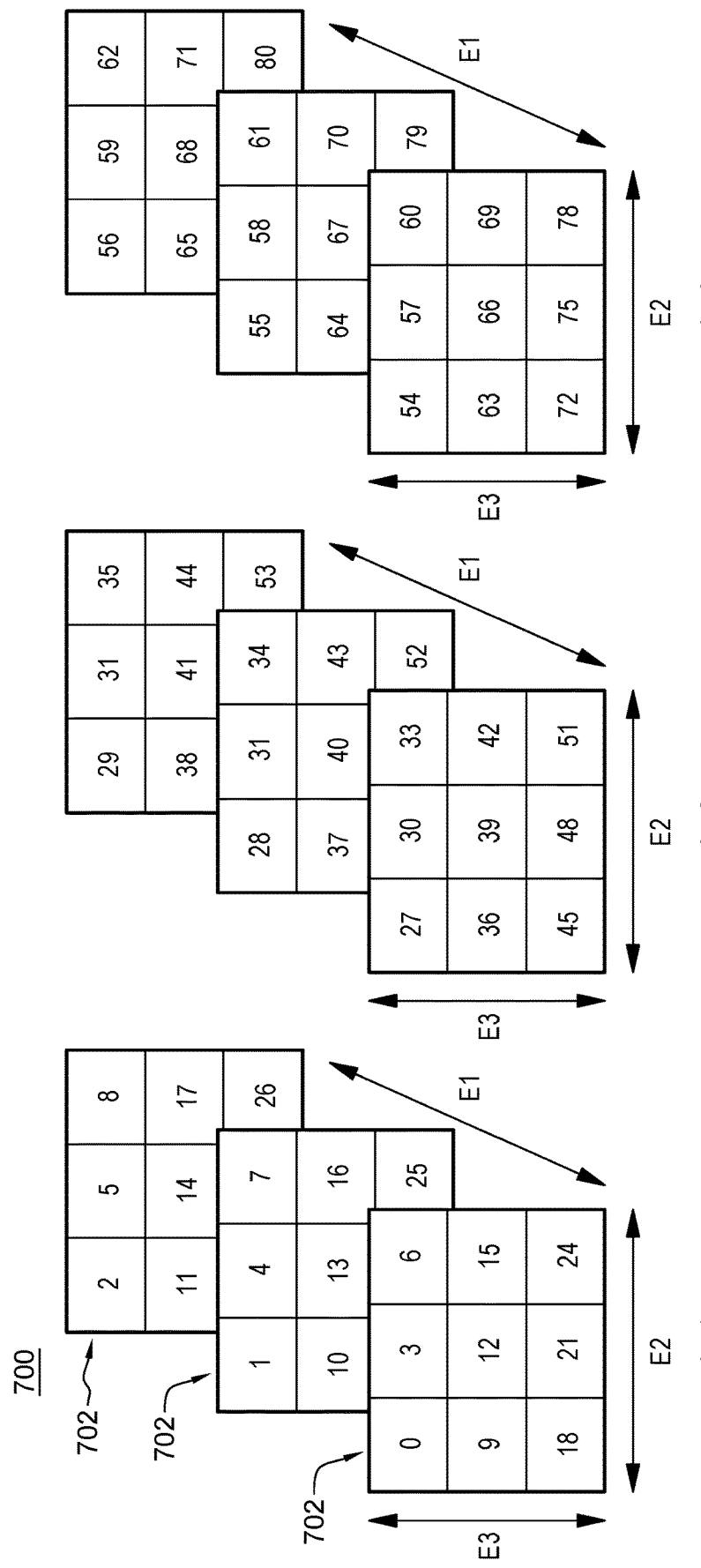

PAGE 0 (E4 = 1)

| e2_page_idx | e1_page_idx | | | |
|---|---|---|---|---|
| | 0 | 1 | 2 | 3 to 63 |
| 0 | 0 | 1 | 2 | PAD |
| 1 | 3 | 4 | 5 | PAD |
| 2 | 6 | 7 | 8 | PAD |
| 3-31 | PAD | PAD | PAD | PAD |

PAGE 1

| e2_page_idx | e1_page_idx | | | |
|---|---|---|---|---|
| | 0 | 1 | 2 | 3 to 63 |
| 0 | 9 | 10 | 11 | PAD |
| 1 | 12 | 13 | 14 | PAD |
| 2 | 15 | 16 | 17 | PAD |
| 3-31 | PAD | PAD | PAD | PAD |

PAGE 2

| e2_page_idx | e1_page_idx | | | |
|---|---|---|---|---|
| | 0 | 1 | 2 | 3 to 63 |
| 0 | 18 | 19 | 20 | PAD |
| 1 | 21 | 22 | 23 | PAD |
| 2 | 24 | 25 | 26 | PAD |
| 3-31 | PAD | PAD | PAD | PAD |

FIG. 8A

PAGE 3 (E4 = 2)

| e2_page_idx | e1_page_idx | | | |
|---|---|---|---|---|
| | 0 | 1 | 2 | 3 to 63 |
| 0 | 27 | 28 | 29 | PAD |
| 1 | 30 | 31 | 32 | PAD |
| 2 | 33 | 34 | 35 | PAD |
| 3-31 | PAD | PAD | PAD | PAD |

PAGE 4

| e2_page_idx | e1_page_idx | | | |
|---|---|---|---|---|
| | 0 | 1 | 2 | 3 to 63 |
| 0 | 36 | 37 | 38 | PAD |
| 1 | 39 | 40 | 41 | PAD |
| 2 | 42 | 43 | 44 | PAD |
| 3-31 | PAD | PAD | PAD | PAD |

PAGE 5

| e2_page_idx | e1_page_idx | | | |
|---|---|---|---|---|
| | 0 | 1 | 2 | 3 to 63 |
| 0 | 45 | 46 | 47 | PAD |
| 1 | 48 | 49 | 50 | PAD |
| 2 | 51 | 52 | 53 | PAD |
| 3-31 | PAD | PAD | PAD | PAD |

FIG. 8B

PAGE 6 (E4 = 3)

| e2_page_idx | e1_page_idx | | | |
|---|---|---|---|---|
| | 0 | 1 | 2 | 3 to 63 |
| 0 | 54 | 55 | 56 | PAD |
| 1 | 57 | 58 | 59 | PAD |
| 2 | 60 | 61 | 62 | PAD |
| 3-31 | PAD | PAD | PAD | PAD |

PAGE 7

| e2_page_idx | e1_page_idx | | | |
|---|---|---|---|---|
| | 0 | 1 | 2 | 3 to 63 |
| 0 | 63 | 64 | 65 | PAD |
| 1 | 66 | 67 | 68 | PAD |
| 2 | 69 | 70 | 71 | PAD |
| 3-31 | PAD | PAD | PAD | PAD |

PAGE 8

| e2_page_idx | e1_page_idx | | | |
|---|---|---|---|---|
| | 0 | 1 | 2 | 3 to 63 |
| 0 | 72 | 73 | 74 | PAD |
| 1 | 75 | 76 | 77 | PAD |
| 2 | 78 | 79 | 80 | PAD |
| 3-31 | PAD | PAD | PAD | PAD |

FIG. 8C

PERFORM A CONVERSION OPERATION TO CONVERT WORKLOAD DATA OF ONE OR MORE DATA TYPES TO ONE OR MORE OTHER DATA TYPES ~900

THE PERFORMING THE CONVERSION OPERATION INCLUDES PERFORMING A PLURALITY OF CONVERSION ACTIONS ~902

A CONVERSION ACTION OF THE PLURALITY OF CONVERSION ACTIONS INCLUDES

PROCESSING AN INSTRUCTION TO CONVERT SELECTED DATA FROM A SOURCE DATA TYPE TO A TARGET DATA TYPE ~904

THE PROCESSING THE INSTRUCTION INCLUDES

DETERMINING WHETHER A DATA TYPE INDICATED USING THE INSTRUCTION IS A VALID DATA TYPE FOR A SELECT MACHINE ~906

THE DATA TYPE BEING A SELECTED DATA TYPE SELECTED FROM THE SOURCE DATA TYPE OR THE TARGET DATA TYPE 907

CONVERTING THE SELECTED DATA FROM THE SOURCE DATA TYPE TO THE TARGET DATA TYPE, BASED ON DETERMINING THAT THE DATA TYPE IS A VALID DATA TYPE FOR THE SELECT MACHINE ~908

910
SETTING AN INDICATOR TO A SELECT VALUE TO INDICATE THE DATA TYPE IS AN INVALID DATA TYPE FOR THE SELECT MACHINE, BASED ON DETERMINING THAT THE DATA TYPE IS AN INVALID DATA TYPE FOR THE SELECT MACHINE, THE INDICATOR TO BE CHECKED AT AN END OF THE CONVERSION OPERATION ~912

CHECKING THE INDICATOR AT THE END OF THE CONVERSION OPERATION TO DETERMINE WHETHER ONE OR MORE PROCESSED INSTRUCTIONS SPECIFIED AN INVALID DATA TYPE ~914

FIG. 9A

THE PERFORMING THE CONVERSION OPERATION INCLUDES

SETTING THE INDICATOR TO AN INITIAL VALUE AT A BEGINNING OF THE CONVERSION OPERATION PRIOR TO PERFORMING THE PLURALITY OF CONVERSION ACTIONS — 920

CHECKING THE INDICATOR AT AN END OF THE PLURALITY OF CONVERSION ACTIONS TO DETERMINE WHETHER ONE OR MORE INSTRUCTIONS SPECIFIED AN INVALID DATA TYPE — 922

---

DETERMINING INCLUDES DETERMINING WHETHER ANOTHER DATA TYPE OF THE SOURCE DATA TYPE OR THE TARGET DATA TYPE IS VALID FOR THE SELECT MACHINE — 924

THE CONVERTING THE SELECTED DATA IS PERFORMED BASED ON THE SOURCE DATA TYPE AND THE TARGET DATA TYPE BEING VALID DATA TYPES FOR THE SELECT MACHINE — 926

INDICATOR IS SET TO THE SELECT VALUE BASED ON EITHER THE SOURCE DATA TYPE OR THE TARGET DATA TYPE BEING AN INVALID DATA TYPE FOR THE SELECT MACHINE — 928

---

DETERMINING INCLUDES DETERMINING WHETHER ANOTHER DATA TYPE OF THE SOURCE DATA TYPE OR THE TARGET DATA TYPE IS VALID FOR THE SELECT MACHINE — 930

THE CONVERTING THE SELECTED DATA IS PERFORMED BASED ON THE SOURCE DATA TYPE AND THE TARGET DATA TYPE BEING VALID DATA TYPES FOR THE SELECT MACHINE — 932

THE INDICATOR IS SET TO THE SELECT VALUE BASED ON THE SELECTED DATA TYPE BEING INVALID FOR THE SELECT MACHINE AND IS NOT SET BASED ON THE OTHER DATA TYPE BEING INVALID FOR THE SELECT MACHINE — 934

---

THE PROCESSING THE INSTRUCTION FURTHER INCLUDES PROVIDING AN EXCEPTION BASED ON THE OTHER DATA TYPE BEING INVALID FOR THE SELECT MACHINE — 936

---

THE PROCESSING THE INSTRUCTION INCLUDES PROVIDING A DEFAULT RESPONSE BASED ON SETTING THE INDICATOR TO THE SELECT VALUE TO INDICATE THE DATA TYPE IS AN INVALID DATA TYPE FOR THE SELECT MACHINE — 940

---

THE WORKLOAD IS OF A VIRTUAL MACHINE MIGRATED FROM ONE MACHINE TO THE SELECT MACHINE — 942

---

THE SETTING OF THE INDICATOR IS A DETECTION OF A CHANGE IN UNDERLYING HARDWARE OF THE SELECT MACHINE — 944

---

THE DATA TYPE INCLUDES A MACHINE-SPECIFIC DATA TYPE FOR THE SELECT MACHINE — 950

THE MACHINE-SPECIFIC DATA TYPE IS SPECIFIED BY THE SOURCE DATA TYPE OR THE TARGET DATA TYPE BASED ON THE INSTRUCTION BEING PROCESSED — 952

FIG. 9B

DETECTION OF INVALID MACHINE-SPECIFIC DATA TYPES DURING DATA CONVERSION

BACKGROUND

One or more aspects relate, in general, to facilitating processing within a computing environment, and in particular, to improving such processing.

A computing environment may include a plurality of virtual machines used to run different workloads. The virtual machines may migrate between different hardware machine models and/or machine generations while running. The migrations are performed to support hardware upgrades, hardware repairs, hypervisor software updates and/or for load balancing.

When a virtual machine migrates from one hardware machine to another hardware machine, the workload of that virtual machine also migrates to the other hardware machine while the virtual machine is running. Absent this ability, certain properties of the workload, such as reliability, availability and serviceability, are diminished. However, if the other hardware machine is of a different model/generation from the hardware machine from which the workload migrated, it is necessary to ensure that the data formats/types used by the workload are supported by the other hardware machine. For certain workloads, such as those that perform numerous data conversions, this is time-consuming since a check is performed and handled for each individual conversion, reducing system performance and increasing use of system resources.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes performing a conversion operation to convert workload data of one or more data types to one or more other data types. The performing the conversion operation includes performing a plurality of conversion actions. A conversion action of the plurality of conversion actions includes processing an instruction to convert selected data from a source data type to a target data type. The processing the instruction includes determining whether a data type indicated using the instruction is a valid data type for a select machine. The data type is a selected data type selected from the source data type or the target data type. The selected data is converted from the source data type to the target data type, based on determining that the data type is a valid data type for the select machine. An indicator is set to a select value to indicate the data type is an invalid data type for the select machine, based on determining that the data type is an invalid data type for the select machine. The indicator is to be checked at an end of the conversion operation.

By checking the indicator at the end of a conversion operation that includes a plurality of conversion actions, performance of the conversion operation is improved, further improving system performance and/or the performance of, for instance, the conversion operation.

In one embodiment, the indicator is checked at the end of the conversion operation to determine whether one or more processed instructions specified an invalid data type.

In one embodiment, the performing the conversion operation includes setting the indicator to an initial value at a beginning of the conversion operation prior to performing the plurality of conversion actions and checking the indicator at an end of the plurality of conversion actions to determine whether one or more instructions specified an invalid data type.

By setting an indicator that is checked subsequent to the conversion operation, rather than taking an exception or checking a condition code after each individual conversion action, branching or exception checking after each conversion action of the conversion operation is avoided.

In one example, the determining further includes determining whether another data type of the source data type or the target data type is valid for the select machine. The converting the selected data is performed based on the source data type and the target data type being valid data types for the select machine, and the indicator is set to the select value based on either the source data type or the target data type being an invalid data type for the select machine.

In one example, the determining further includes determining whether another data type of the source data type or the target data type is valid for the select machine. The converting the selected data is performed based on the source data type and the target data type being valid data types for the select machine, and the indicator is set to the select value based on the selected data type being invalid for the select machine and is not set based on the other data type being invalid for the select machine.

In one embodiment, the processing further includes providing an exception based on the other data type being invalid for the select machine.

In one embodiment, the processing the instruction includes providing a default response based on setting the indicator to the select value to indicate the data type is an invalid data type for the select machine.

As an example, the workload is of a virtual machine migrated from one machine to the select machine. The setting of the indicator is, for instance, a detection of a change in underlying hardware of the select machine.

In one example, the data type includes a machine-specific data type for the select machine. The machine-specific data type is, for instance, specified by the source data type or the target data type based on the instruction being processed.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6C depicts examples of function codes supported by the Neural Network Processing Assist instruction, in accordance with one or more aspects of the present invention;

FIG. 6D depicts one example of another general register used by the Neural Network Processing Assist instruction, in accordance with one or more aspects of the present invention;

FIG. 6E depicts one example of a parameter block used by a query function of the Neural Network Processing Assist instruction, in accordance with one or more aspects of the present invention;

FIG. 6F depicts one example of a parameter block used by one or more non-query functions of the Neural Network Processing Assist instruction, in accordance with one or more aspects of the present invention;

FIG. 6G depicts one example of a tensor descriptor used by the Neural Network Processing Assist instruction, in accordance with one or more aspects of the present invention;

FIGS. 7A-7C depict examples of an input data layout used by the Neural Network Processing Assist instruction, in accordance with one or more aspects of the present invention;

FIGS. 8A-8C depict example output corresponding to the input data layout of FIGS. 7A-7C, in accordance with one or more aspects of the present invention;

FIGS. 9A-9B depict one example of facilitating processing within a computing environment, in accordance with one or more aspects of the present invention;

DETAILED DESCRIPTION

In accordance with one or more aspects of the present invention, a capability is provided to facilitate processing within a computing environment. In one aspect, the capability includes facilitating migration of virtual machines, while running, referred to as live migration. The migration includes migrating at least one workload from one hardware machine to another hardware machine. The other hardware machine may be a different type of machine than the hardware machine from which the workload is migrated, such as a different machine model, as an example. A machine model is a machine that has certain capabilities. A different machine model may have additional, fewer and/or different capabilities than another machine model and/or be of a different generation (e.g., a current or future generation) having additional, fewer and/or different capabilities. Other possibilities also exist.

When the workload is migrated, in accordance with an aspect of the present invention, a check is made as to whether the data formats/types used by the workload are supported on the hardware machine to which the workload was migrated. For instance, for greater efficiency, a particular machine model may operate on a specific internal or machine-specific data format/type used to represent the input/output data. As an example, input data of a workload is converted from a standard format to a machine-specific format, and the output data is converted back to the standard format. Other examples are also possible. Thus, in accordance with an aspect of the present invention, the converting to/from the machine-specific format includes checking whether the one or more data types are valid data types of the machine to which the workload was migrated. The checking is performed in a manner that is efficient, not complex and increases system performance. This improves performance of the conversions, as well as the migration, improving system performance and data availability.

In one example, the converting includes using one or more conversion instructions. Each instruction is a single instruction (e.g., a single architected hardware machine instruction at the hardware/software interface) configured to perform, at the very least, a conversion function. Each instruction may be part of a general-purpose processor instruction set architecture (ISA), which is dispatched by a program on a processor, such as a general-purpose processor or may be part of a special-purpose processor, such as a co-processor configured for certain functions, that is coupled to or part of the general-purpose processor. Other variations are also possible.

Figure 1A:
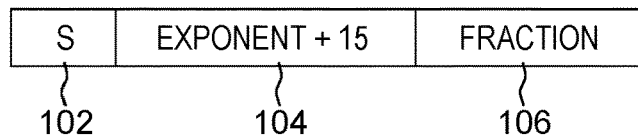
FIGS. 1A-1D depict examples of binary floating-point formats, in accordance with one or more aspects of the present invention.
Figure 1B:
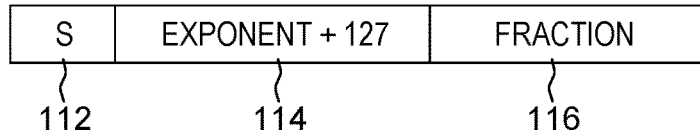
Figure 1C:
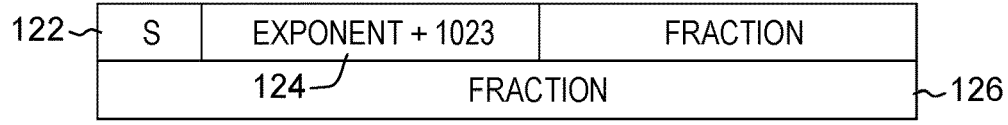
Figure 1D:
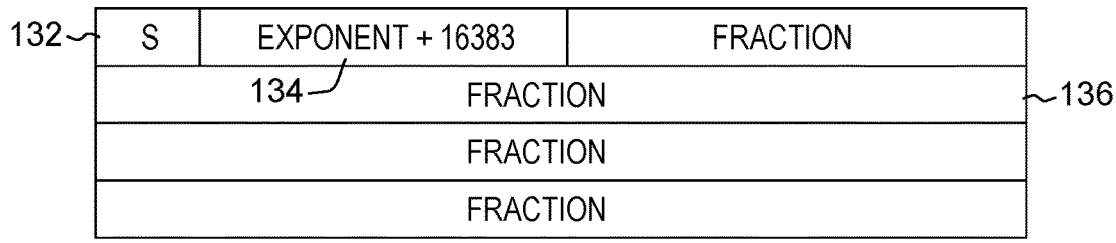

Each instruction indicates a source data type and a target data type and converts the source data type to the target data type. As one example, one of the data types is a binary floating-point data type (which is considered a standard data type). Binary floating-point data may be represented in a number of different formats including, for instance tiny, short, long or extended, examples of which are described with reference to FIGS. 1A-1D. Referring to FIG. 1A, a binary floating-point tiny format 100 includes, for example, a sign 102 (e.g., bit 0), an exponent+15 (104) (e.g., bits 1-5), and a fraction 106 (e.g., bits 6-15). With reference to FIG. 1B, a binary floating-point short format 110 includes, for example, a sign 112 (e.g., bit 0), an exponent+127 (114) (e.g., bits 1-8), and a fraction 116 (e.g., bits 9-31); and referring to FIG. 1C, a binary floating-point long format 120 includes, for example, a sign 122 (e.g., bit 0), an exponent+1023 (124) (e.g., bits 1-11), and a fraction 126 (e.g., bits 12-63). Further, with reference to FIG. 1D, a binary floating-point extended format 130 includes, for example, a sign 132 (e.g., bit 0), an exponent+16383 (134) (e.g., bits 1-15), and a fraction 136 (e.g., bits 16-127). Other formats are also possible.

As examples, when an operand in the binary floating-point short format is loaded into a floating-point register, it occupies the left half of the register and the right half remains unchanged. When an operand in the binary floating-point long format is loaded into a floating-point register, it occupies the entire register. An operand in the binary floating-point extended format occupies a register pair. The sign and biased exponent are in the leftmost 16 bits of the lower-numbered register of a register pair and are followed by the leftmost 48 bits of the fraction. The rightmost 64 bits of the fraction are in the higher-numbered register of the register pair.

Example properties of each of the formats are described below:

Where $\approx$ indicates that the value is approximate, Emax is maximum left-units-view (LUV) exponent, Emin is minimum left-units-view exponent, Nmax is largest (in magnitude) representable finite number, and Nmin is smallest (in magnitude) representable normal number.

For each format, the bias that is used to allow all exponents to be expressed as unsigned numbers is indicated above, as examples.

In each format, the binary point of a binary floating-point number is considered to be to the left of the leftmost fraction bit. To the left of the binary point there is an implied unit bit, which is considered to be one for normal numbers and zero for zeros and subnormal numbers. The fraction with the implied unit bit appended on the left is the significand of the number.

The value of a normal binary floating-point number is the significand multiplied by the radix 2 raised to the power of the unbiased exponent. The value of a subnormal binary floating-point number is the significand multiplied by the radix 2 raised to the power of the minimum exponent.

Example values of non-zero numbers for the various formats are described below:

| Number Class | Format | Value |
| --- | --- | --- |
| Normal | Tiny | $\pm 2^{e-15} \times (1.f)$ |
|  | Short | $\pm 2^{e-127} \times (1.f)$ |
|  | Long | $\pm 2^{e-1023} \times (1.f)$ |
|  | Extended | $\pm 2^{e-16383} \times (1.f)$ |
| Subnormal | Tiny | $\pm 2^{-14} \times (0.f)$ |
|  | Short | $\pm 2^{-126} \times (0.f)$ |
|  | Long | $\pm 2^{-1022} \times (0.f)$ |
|  | Extended | $\pm 2^{-16382} \times (0.f)$ |

Where: e is biased exponent (shown in decimal), and f is fraction (in binary).

| Property | Tiny | Short | Long | Extended |
| --- | --- | --- | --- | --- |
| Format length (bits) | 16 | 32 | 64 | 128 |
| Biased-exponent length (bits) | 5 | 8 | 11 | 15 |
| Fraction length (bits) | 10 | 23 | 52 | 112 |
| Precision (p) | 11 | 24 | 53 | 113 |
| Emax | 15 | 127 | 1023 | 16383 |
| Emin | −14 | −126 | −1022 | −16382 |
| LUV bias | 15 | 127 | 1023 | 16383 |
| Nmax | $(1-2^{-11}) \times 2^{16}$ | $(1-2^{-24}) \times 2^{128}$ | $(1-2^{-53}) \times 2^{1024}$ | $(1-2^{-113}) \times 2^{16384}$ |
|  |  | $\approx 3.4 \times 10^{38}$ | $\approx 1.8 \times 10^{308}$ | $\approx 1.2 \times 10^{4932}$ |
| Nmin | $1.0 \times 2^{-14}$ | $1.0 \times 2^{-126}$ | $1.0 \times 2^{-1022}$ | $1.0 \times 2^{-16382}$ |
|  |  | $\approx 1.2 \times 10^{-38}$ | $\approx 2.2 \times 10^{-308}$ | $\approx 3.4 \times 10^{-4932}$ |
| Dmin | $1.0 \times 2^{-24}$ | $1.0 \times 2^{-149}$ | $1.0 \times 2^{-1074}$ | $1.0 \times 2^{-16494}$ |
|  |  | $\approx 1.4 \times 10^{-45}$ | $\approx 4.9 \times 10^{-324}$ | $\approx 6.5 \times 10^{-4966}$ |

Further, example floating-point rounding and range actions are described below:

Nontrap Result (r) when Effective Rounding Method is

| Range of v | Case | To Nearest with ties to even | To Nearest with ties away from 0 | Toward 0 | Toward +∞ | Toward ∞ | Prepare for shorter precision |
|---|---|---|---|---|---|---|---|
| v < −Nmax, g < −Nmax | Overflow | −∞[1] | −∞[1] | −Nmax | −Nmax | −∞[1] | −Nmax |
| v < −Nmax, g = −Nmax | Normal | −Nmax | −Nmax | −Nmax | −Nmax | — | −Nmax |
| −Nmax ≤ v ≤ −Nmin | Normal | g | g | g | g | g | g |
| −Nmin < v ≤ −Dmin | Tiny | d* | d* | d | d | d* | d |
| −Dmin < v < −Dmin/2 | Tiny | −Dmin | −Dmin | −0 | −0 | −Dmin | −Dmin |
| v = −Dmin/2 | Tiny | −0 | −Dmin | −0 | −0 | −Dmin | −Dmin |
| −Dmin/2 < v < 0 | Tiny | −0 | −0 | −0 | −0 | −Dmin | −Dmin |
| v = 0 | Exact zero difference[2] | +0 | +0 | +0 | +0 | −0 | +0 |
| 0 < v < +Dmin/2 | Tiny | +0 | +0 | +0 | +Dmin | +0 | +Dmin |
| v = Dmin/2 | Tiny | +0 | +Dmin | +0 | +Dmin | +0 | +Dmin |
| +Dmin/2 < v < +Dmin | Tiny | +Dmin | +Dmin | +0 | +Dmin | +0 | +Dmin |
| +Dmin ≤ v < +Nmin | Tiny | d* | d* | d | d* | d | d |
| +Nmin ≤ v +Nmax | Normal | g | g | g | g | g | g |
| +Nmax < v, g = +Nmax | Normal | +Nmax | +Nmax | +Nmax | — | +Nmax | +Nmax |
| +Nmax < v, +Nmax < g | Overflow | +∞[1] | +∞[1] | +Nmax | +∞[1] | +Nmax | +Nmax |

— This situation cannot occur.
*The rounded value, in the extreme case, may be Nmin. In this case, the exceptions are underflow, inexact and incremented.
[1] The non-trap result r is considered to have been incremented.
[2] The exact-zero-difference case applies only to, e.g., Vector Floating Point Add, Vector Floating Point Subtract, Vector Floating Point Multiply and Add, Vector Floating Point Multiply and Subtract. For all other binary floating point operations, a zero result is detected by inspection of the source operand elements without use of the R(v) function.
d The denormalized value. The value derived when the precise intermediate value (v) is rounded to the format of the target including both precision and bounded exponent range. Except as explained in note *, this is a subnormal number.
g The precision-rounded value. The value derived when the precise intermediate value (v) is rounded to the precision of the target, but assuming an unbounded exponent range.

Another data type, in accordance with an aspect of the present invention, is a machine-specific or model-dependent data type, rather than a standard data type. A machine-specific or model-dependent data type is, for instance, a data type optimized for use by a particular processor running on a particular hardware machine. One example of a machine-specific or model-dependent data type is an NNP-data-type-1 data type (also referred to as a neural network processing-data-type-1 data type), as an example. This data type is a 16-bit floating-point format that provides a number of advantages for, e.g., deep learning training and inference computations, including, for instance: preserves the accuracy of deep learning networks; eliminates the subnormal format which simplifies rounding modes and handling of corner cases; automatic rounding to the nearest value for arithmetic operations; and special entities of infinity and not-a-number (NaN) are combined into one value (NINF), which is accepted and handled by arithmetic operations. NINF provides better defaults than other formats for exponent overflow and invalid operations (such as division by zero). This allows many programs to continue running without hiding such errors and without using specialized exception handlers. Other machine-specific data types are also possible.

Figure 2:
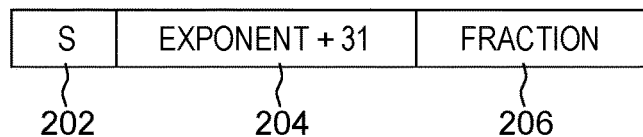
FIG. 2 depicts one example of a format of a Neural Network Processing (NNP)-data-type-1 data type, in accordance with one or more aspects of the present invention.

One example of a format of the NNP-data-type-1 data type is depicted in FIG. 2. As depicted, in one example, NNP-data-type-1 data may be represented in a format 200, which includes, for instance, a sign 202 (e.g., bit 0), an exponent+31 (204) (e.g., bits 1-6) and a fraction 206 (e.g., bits 7-15).

Example properties of the NNP-data-type-1 format are depicted below:

| Property | NNP-data-type-1 |
|---|---|
| Format length (bits) | 16 bits |
| Biased-exponent length (bits) | 6 bits |
| Fraction length (bits) | 9 bits |
| Precision (p) | 10 bits |
| Maximum left-units-view exponent (Emax) | 32 |
| Minimum left-units-view exponent (Emin) | −31 |
| Left-units-view (LUV) bias | 31 |
| Nmax | $(1 - 2^{-9}) \times 2^{33} \approx 8.6 \times 10^9$ |
| Nmin | $(1 + 2^{-9}) \times 2^{-31} \approx 4.6 \times 10^{-10}$ |
| Dmin | — |

Where ≈ indicates that the value is approximate, Nmax is largest (in magnitude) representable finite number, and Nmin is smallest (in magnitude) representable number.

Further details relating to the NNP-data-type-1 data type are described below:

Biased Exponent: The bias that is used to allow exponents to be expressed as unsigned numbers is shown above. Biased exponents are similar to characteristics of the binary floating-point format, except that no special meanings are attached to biased exponents of all zeros and all ones, as described below with reference to the classes of the NNP-data-type-1 data type.

Significand: The binary point of an NNP-data-type-1 number is considered to be to the left of the leftmost fraction bit. To the left of the binary point there is an implied unit bit, which is considered to be one for normal numbers and zero for zeros. The fraction with the implied unit bit appended on the left is the significand of the number.

The value of a normal NNP-data-type-1 is the significand multiplied by the radix 2 raised to the power of the unbiased exponent.

Values of Non-Zero Numbers: The values of non-zero numbers are shown below:

| Number Class | Value |
|---|---|
| Normal numbers | $\pm 2^{e-31} \times (1.f)$ |

Where e is biased exponent shown in decimal, and f is fraction in binary.

In one embodiment, there are three classes of NNP-data-type-1 data, including numeric and related non-numeric entities. Each data item includes a sign, an exponent and a significand. The exponent is biased such that all biased exponents are non-negative unsigned numbers and the minimum biased exponent is zero. The significand includes an explicit fraction and an implicit unit bit to the left of the binary point. The sign bit is zero for plus and one for minus.

All non-zero finite numbers permitted have a unique NNP-data-type-1 representation. There are no subnormal numbers, which numbers might allow multiple representations for the same values, and there are no subnormal arithmetic operations. The three classes include, for instance:

| Data Class | Sign | Biased Exponent | Unit Bit* | Fraction |
|---|---|---|---|---|
| Zero | ± | 0 | 0 | 0 |
| Normal numbers | ± | 0 | 1 | Not 0 |
| Normal numbers | ± | Not 0, not all ones | 1 | Any |
| Normal numbers | ± | All ones | — | Not all ones |
| NINF | ± | All ones | — | All ones |

Where: — indicates does not apply, *indicates the unit bit is implied, NINF is not a number or infinity.

Further details regarding each of the classes are described below:

Zeros: Zeros have a biased exponent of zero and a zero fraction. The implied unit bit is zero.

Normal Numbers: Normal numbers may have a biased exponent of any value. When the biased exponent is 0, the fraction is to be non-zero. When the biased exponent is all ones, the fraction is not to be all ones. Other biased exponent values may have any fraction value. The implied unit bit is one for all normal numbers.

NINF: A NINF is represented by a biased exponent of all ones and a fraction of all ones. A NINF represents a value not in the range of representable values in NNP-data-type-1 (i.e., 16-bit floating-point designed for deep learning (DL) that has 6 exponent bits and 9 fraction bits). Normally, NINFs are just propagated during computations so that they will remain visible at the end.

Although binary floating-point data formats and the NNP-data-type-1 data type are provided as examples, additional, fewer and/or other data formats/types may also be used.

Figure 3A:
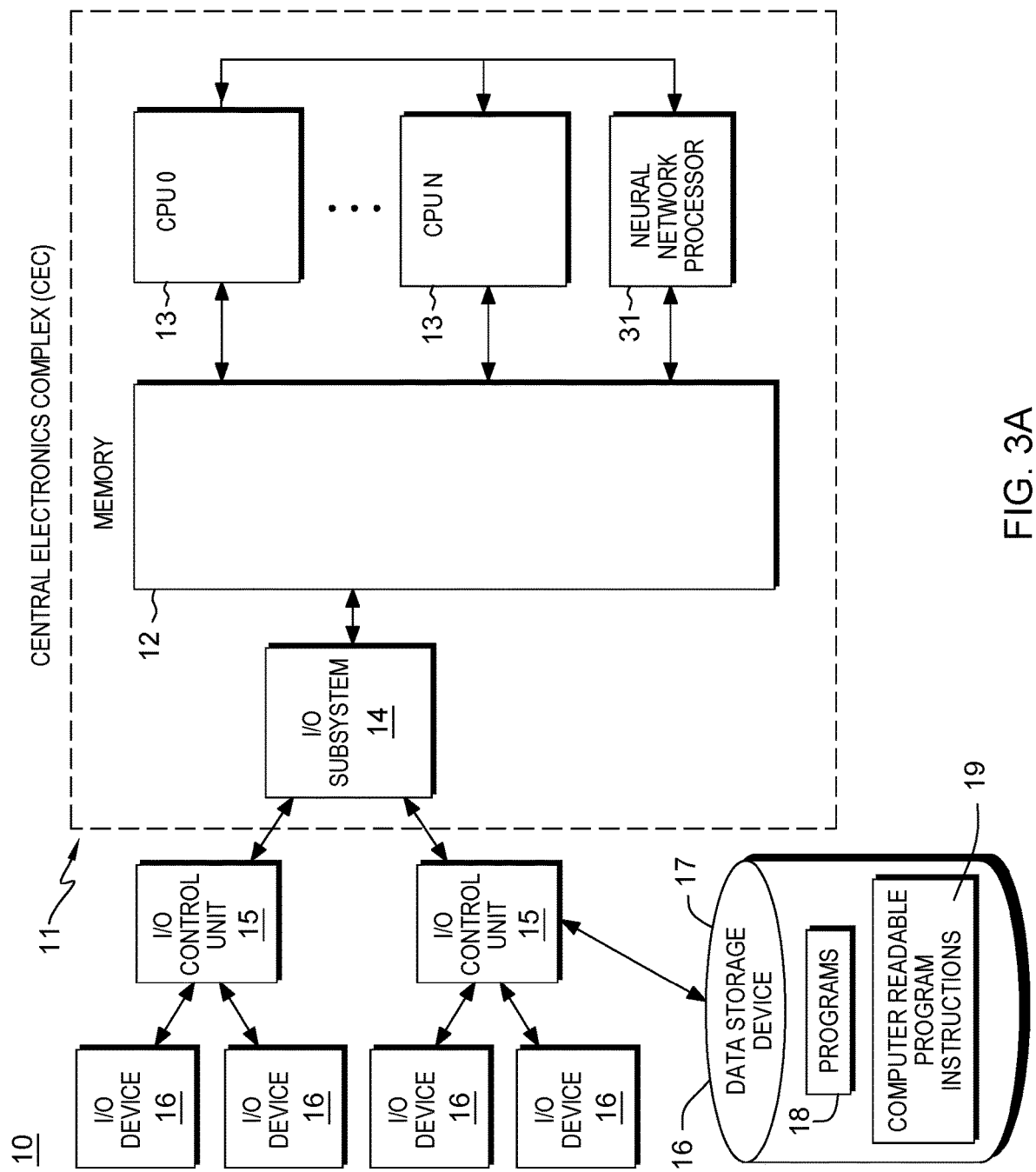
FIG. 3A depicts one example of a computing environment to incorporate and use one or more aspects of the present invention.

One embodiment of a computing environment to incorporate and use one or more aspects of the present invention is described with reference to FIG. 3A. As an example, the computing environment of FIG. 3A is based on the z/Architecture® instruction set architecture offered by International Business Machines Corporation, Armonk, N.Y. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors, such as one or more general-purpose processors (a.k.a., central processing units (CPUs) 13) and one or more special-purpose processors (e.g., neural network processor 31), and to an input/output (I/O) subsystem 14.

As examples, the one or more special-purpose processors may be separate from the one or more general-purpose processors and/or at least one special-purpose processor may be embedded within at least one general-purpose processor. Other variations are also possible.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 3C:
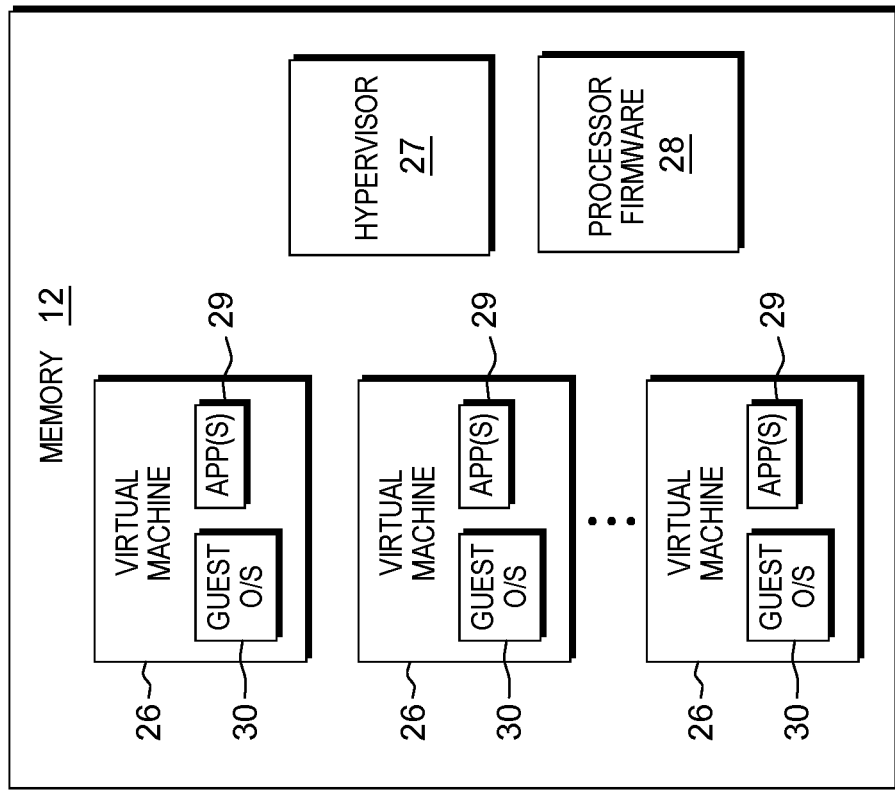
FIG. 3C depicts another example of further details of a memory of FIG. 3A, in accordance with one or more aspects of the present invention.
Figure 3B:
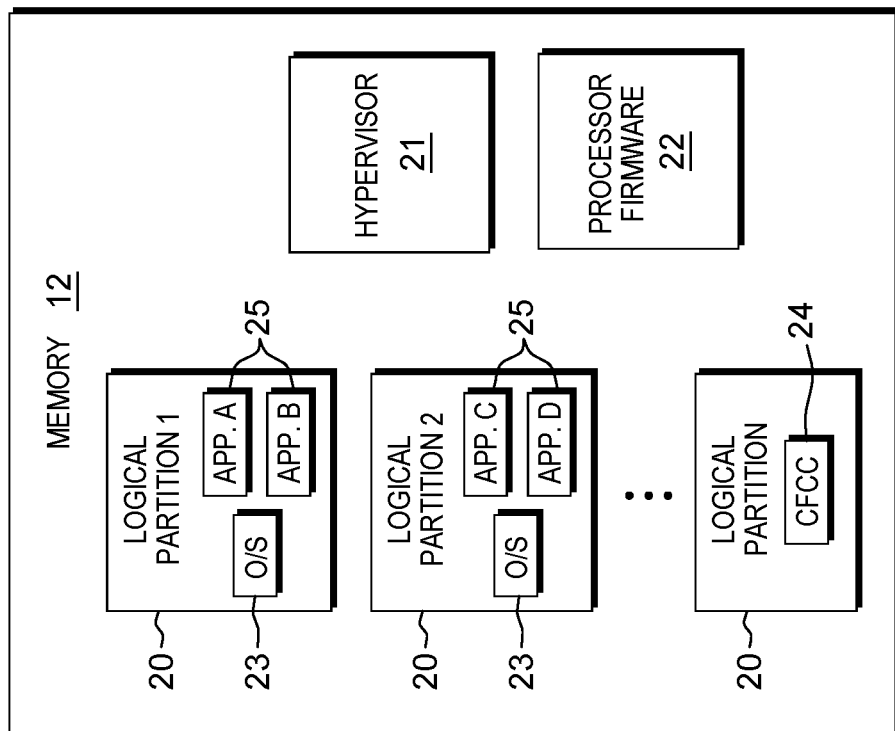
FIG. 3B depicts one example of further details of a memory of FIG. 3A, in accordance with one or more aspects of the present invention.

Central electronics complex 11 provides in one or more embodiments logical partitioning and/or virtualization support. As shown in FIG. 3B, memory 12 includes, for example, one or more logical partitions 20, a hypervisor 21 that manages the logical partitions, and processor firmware 22. One example of hypervisor 21 is the Processor Resource/System Manager (PR/SW™), offered by International Business Machines Corporation, Armonk, N.Y. As used herein, firmware includes, e.g., the microcode or millicode of the processor. It includes, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention. z/OS is a trademark or registered trademark of International Business Machines Corporation in at least one jurisdiction.

Memory 12 is coupled to, e.g., CPUs 13 (FIG. 3A), which are physical processor resources that can be allocated to the logical partitions. For instance, a logical partition 20 may include one or more logical processors, each of which represents all or a share of a physical processor resource 13 that can be dynamically allocated to the logical partitions.

In another embodiment, central electronics complex 11 provides virtualization support (either with or without logical partitioning support). As shown in FIG. 3C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 3D:
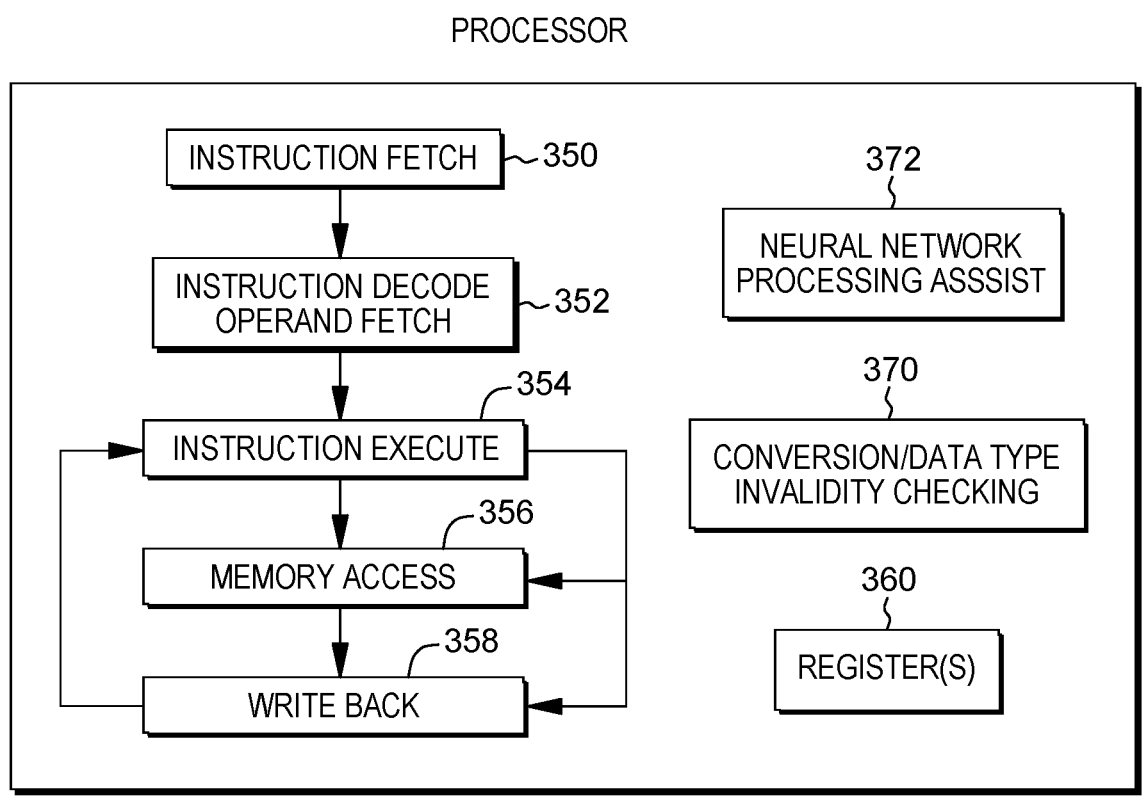
FIG. 3D depicts further details of a processor of FIG. 3A, in accordance with one or more aspects of the present invention.

In one example, a processor (e.g., processor 13 and/or processor 31) includes a plurality of functional components (or a subset thereof) used to execute instructions. As depicted in FIG. 3D, these functional components include, for instance, an instruction fetch component 350 to fetch instructions to be executed; an instruction decode unit 352 to decode the fetched instructions and to obtain operands of the decoded instructions; one or more instruction execute components 354 to execute the decoded instructions; a memory access component 356 to access memory for instruction execution, if necessary; and a write back component 358 to provide the results of the executed instructions. One or more of the components may access and/or use one or more registers 360 in instruction processing. Further, one or more of the components may, in accordance with one or more aspects of the present invention, include at least a portion of or have access to one or more other components used in performing data type invalidity checking and/or conversion processing of, e.g., one or more conversion instructions, and/or neural network processing assist processing of, e.g., a Neural Network Processing Assist instruction (or other processing that may use one or more aspects of the present invention), as described herein. The one or more other components include, for instance, a conversion and/or data type invalidity checking component 370 and/or a neural network processing assist component 372 (and/or one or more other components).

In accordance with an aspect of the present invention, at least one workload (of, e.g., a virtual machine) is migrated from one hardware machine to another hardware machine (referred to herein as a select machine). The other hardware machine may be a different type of machine than the one machine, such as a different machine model, as an example. The migrating includes migrating workload from the one hardware machine to the other hardware machine. Based on migrating the workload, in one example, a check is made as to whether the data formats/types used by the workload are supported on the hardware machine to which the workload was migrated. For instance, for greater efficiency, a select machine of a particular machine model may operate on a specific internal or machine-specific data format/type used to represent the input/output data. In such a case, as an example, input data of a workload is converted from a standard format to the machine-specific format, and the output data is converted back to the standard format. Other examples are also possible. Thus, in accordance with an aspect of the present invention, the converting to/from the machine-specific format includes checking whether the one or more data types are valid data types of the machine on which the workload was migrated. The checking is performed in a manner that is efficient, not complex and increases system performance.

In one example, in accordance with an aspect of the present invention, a conversion operation is performed by, e.g., a general-purpose processor (e.g., processor 13) to enable a select processor of a particular machine model (e.g., neural network processor 31) to perform functions on data in a machine-specific format. This operation includes, for instance, initializing an indicator, performing one or more conversion actions (e.g., many conversion actions) by processing (e.g., decoding, executing, or decoding and executing) one or more conversion instructions one or more times, and checking the indicator after performing the conversion operation, including the conversion actions to be performed to determine whether the data types are valid. Further details regarding this processing are described with reference to FIGS. 4A-4B.

Figure 4A:
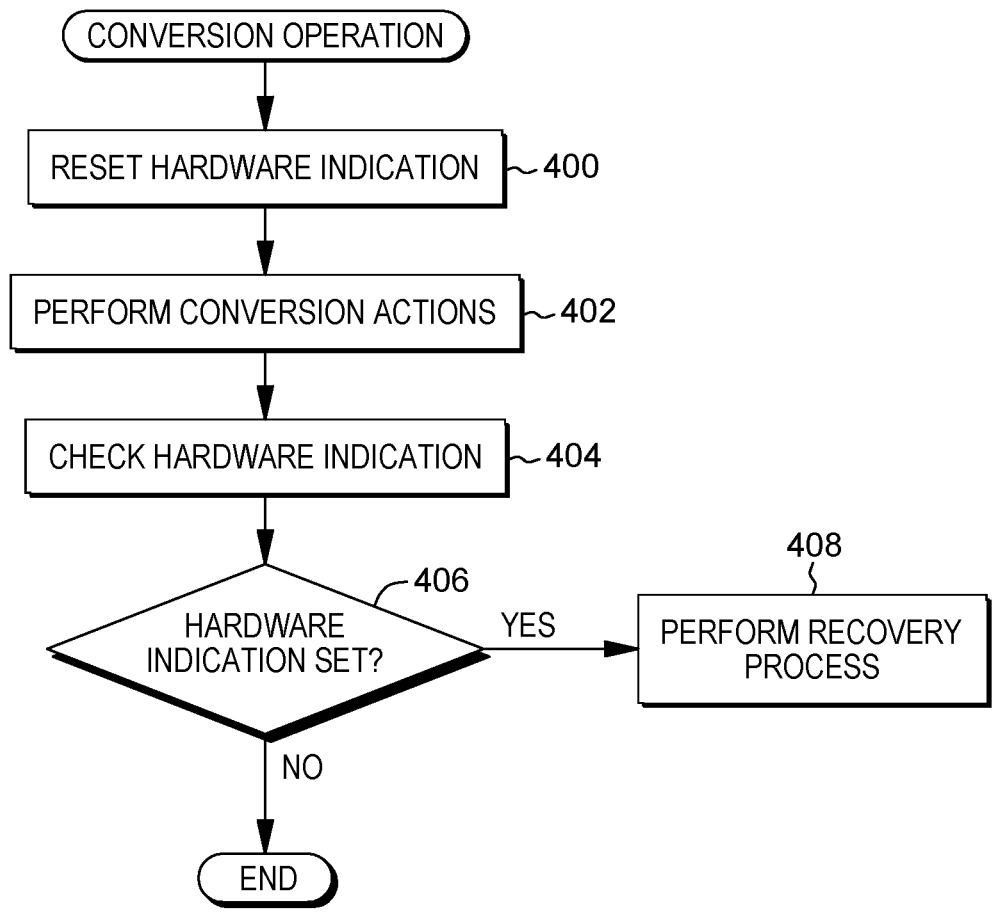
FIG. 4A depicts one example of a conversion operation, in accordance with one or more aspects of the present invention.

Referring to FIG. 4A, an indicator, such as a hardware indication (e.g., a flag, such as an IEEE-inexact exception flag), is initialized or reset (e.g., set to a select value, such as zero) 400. Further, one or more conversion actions are performed 402. For instance, a plurality of conversion actions are performed in which for each conversion action, a selected conversion instruction is used (depending on the conversion action to be performed). In one example, many of these conversion actions are performed as part of one conversion operation. An individual conversion action of the conversion operation may convert data of a source data type to data of a target data type, or set the indicator (e.g., to another select value, such as one) based on determining one of the data types is invalid. Based on performing the one or more conversion actions (e.g., subsequent to performing the plurality of conversion actions), the indicator is checked 404. If the indicator is set (e.g., to the other select value, such as one) 406, it is an indication that one or more data types included as operands in one or more of the conversion instructions are invalid for the select machine, and therefore, recovery is performed 408. This includes, for instance, backing out of the conversion operation or other processing and/or selecting another data type and re-executing one or more of the conversion instructions one or more times (e.g., all of the conversion instructions, a subset of the conversion instructions, etc.). However, if the indicator is not set (e.g., it remains zero) 406, then processing successfully completes.

Figure 4B:
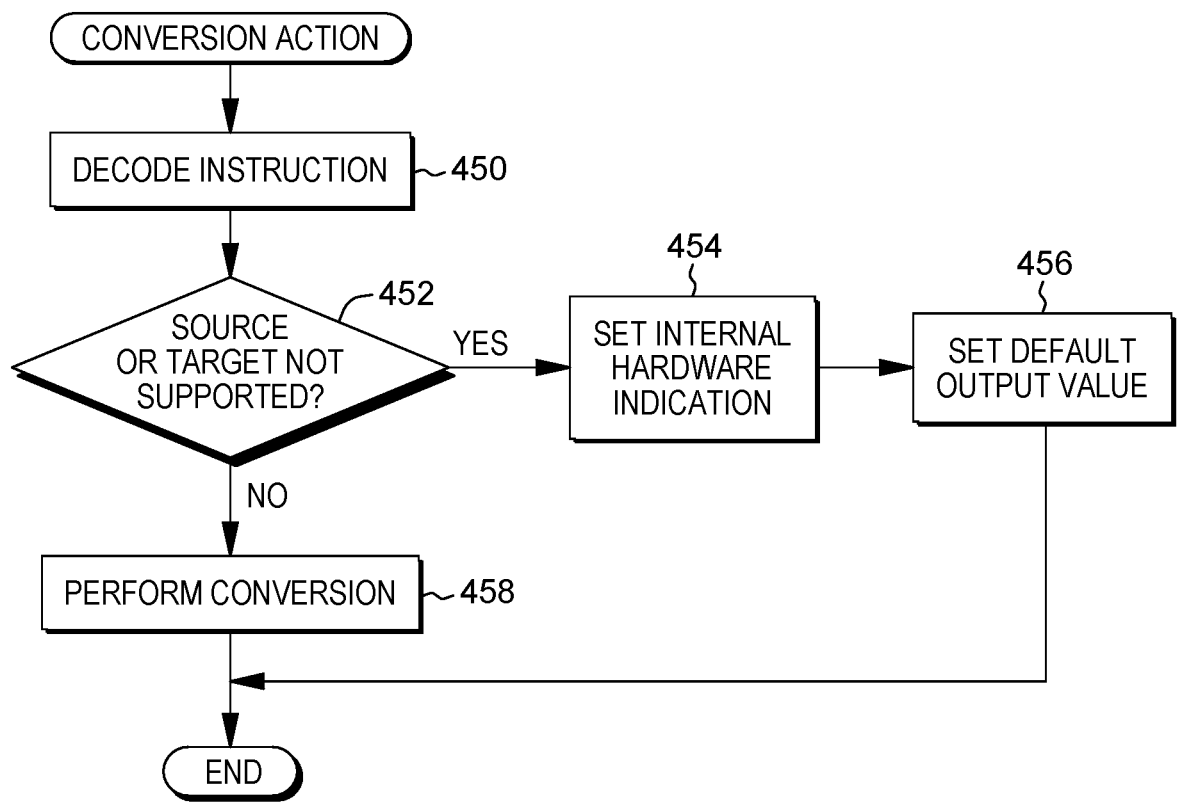
FIG. 4B depicts one example of processing an instruction to perform a conversion action of the conversion operation of FIG. 4A, in accordance with one or more aspects of the present invention.

Further details regarding one embodiment of performing a conversion action of the conversion operation are described with reference to FIG. 4B. In one example, an appropriate conversion instruction is selected and decoded 450. The conversion instruction selected depends, for instance, on the source and target data types, as well as other processing to be performed. Example conversion instructions include, for instance, a Vector Floating Point Convert and Lengthen From Neural Network Processing High instruction, a Vector Floating Point Convert and Lengthen From Neural Network Processing Low instruction, a Vector Floating Point Convert and Round to Neural Network Processing instruction, a Vector Floating Point Convert From Neural Network Processing instruction and a Vector Floating Point Convert To Neural Network Processing instruction. Additional, fewer and/or other conversion instructions may be used depending, for instance, on the data types to be converted, etc.

The decoding includes, for instance, obtaining one or more input operands of the instruction (e.g., text information provided in one or more masks) and determining whether the source data type and/or the target data type provided in the one or more input operands of the selected instruction are supported by the select machine 452. As an example, this determination is made by checking that the data types are standard data types, one of the binary floating-point formats or another standard data type) and/or a machine-specific data type supported by the select machine (e.g., NNP-data-type-1). To determine whether one or more of the inputs are standard data types, in one example, a list of standard data types stored, e.g., in memory, registers, etc. is checked to see if the input data type is on the list. Further, in one example, to determine whether one or more of the input data types are machine-specific data types supported by the select machine (e.g., supported by the particular model of the select machine), a query is performed of supported data types of the select machine. In one example, the query is performed as a function of an instruction, such as a Neural Network Processing Assist instruction, an example of which is described below. Although a checking of a list and/or a query function is used as examples to determine the supported data types, in other embodiments, other mechanisms may be used.

If the source and/or target data types are not supported by the machine 452, then the indicator (e.g., IEEE-inexact exception flag) is set (e.g., to one) 454. In another embodiment, the indicator is set only if one of the data types is a machine-specific data type and that data type is not supported. In another embodiment, the indicator is set only if the machine-specific data type is not supported and a specification exception, as an example, is provided if a standard data type is indicated but not supported. In yet another example, validity is checked for only non-standard formats, such as machine-specific data types/formats; standard formats are assumed valid. Other variations are also possible.

Further, if the indicator is set, so is a default output value 456. This includes, for instance, placing a select value (e.g., zeros, the input value, or any other select value) in the output operand of the instruction (e.g., in an output operand register, etc.).

However, if both the source and target data types are valid (either checked and/or assumed to be valid), the conversion is performed 458 resulting in converted data of the target type. This completes processing of one conversion action. This processing (e.g., conversion processing of FIG. 4B, which is one conversion action 402 in FIG. 4A) is reiterated one or more times for other data/data types to be converted. As indicated, this may be performed many times, in one example, as part of the same conversion operation and prior to checking the indicator, which is not checked until the end of the conversion operation (subsequent to the plurality of conversion actions). Each iteration employs a selected conversion instruction, which may be the same or different for the various iterations.

In one embodiment, each of the conversion instructions is, for instance, part of a vector facility, which provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially.

In one embodiment, there are 32 vector registers and other types of registers can map to a quadrant of the vector registers. For instance, a register file, which is an array of processor registers in a central processing unit (e.g., processor 13), may include 32 vector registers and each register is 128 bits in length. Sixteen floating-point registers, which are 64 bits in length, can overlay the vector registers. Thus, as an example, when floating-point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Each of the vector instructions described herein has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

Further, each of the vector instructions includes a register extension bit (RXB) field that includes the most significant bit for a vector register designated operand. Bits for register designations not specified by the instruction are to be reserved and set to zero. The most significant bit is concatenated, for instance, to the left of the four-bit register designation of the vector register field to create a five-bit vector register designation.

In one example, the RXB field includes four bits (e.g., bits 0-3), and the bits are defined, as follows:
- 0—Most significant bit for the first vector register designation (e.g., in bits 8-11) of the instruction.
- 1—Most significant bit for the second vector register designation (e.g., in bits 12-15) of the instruction, if any.
- 2—Most significant bit for the third vector register designation (e.g., in bits 16-19) of the instruction, if any.
- 3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, bit 0 of RXB is an extension bit for location 8-11, which is assigned to, e.g., $V_1$, and so forth. In particular, for vector registers, the register containing the operand is specified using, for instance, a four-bit field of the register field with the addition of its corresponding register extension bit (RXB) as the most significant bit. For instance, if the four-bit field is 0110 and the extension bit is 0, then the five bit field 00110 indicates register number 6. In a further embodiment, the RXB field includes additional bits, and more than one bit is used as an extension for each vector or location.

In the description herein of the conversion instructions and/or other instructions, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

Figure 5A:
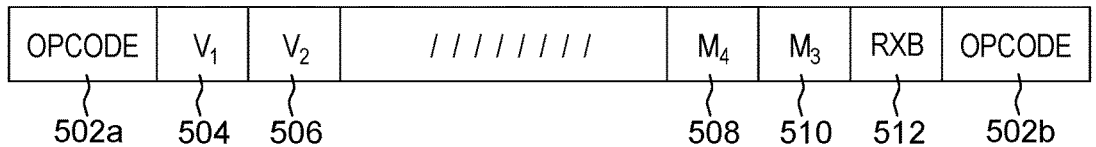
FIG. 5A depicts one example of a format of a Vector Floating Point Convert and Lengthen From Neural Network Processing High instruction, in accordance with one or more aspects of the present invention.

One example of a vector conversion instruction is the Vector Floating Point Convert and Lengthen From Neural Network Processing High instruction, an example of which is described with reference to FIG. 5A. In one embodiment, Vector Floating Point Convert and Lengthen From Neural Network Processing High instruction 500 has a VRR format indicating a vector register to register operand with an extended opcode. It includes, for instance, operation code (opcode) fields 502a, 502b (e.g., bits 0-7 and 40-47) indicating a conversion is to be performed; a first vector register ($V_1$) field 504 (e.g., bits 8-11) used to designate a first vector register; a second vector register ($V_2$) field 506 (e.g., bits 12-15) used to designate a second vector register; a first mask ($M_4$) field 508 (e.g., bits 28-31); a second mask ($M_3$) field 510 (e.g., bits 32-35); and a register extension bit (RXB) field 512 (e.g., bits 36-39), each of which is described herein. In one embodiment, the fields are separate and independent from one another; however, in other embodiments, more than one field may be combined. Further information regarding these fields is described below.

In one embodiment, vector register ($V_1$) field 504 is used to indicate a vector register that is to store the first operand. The first operand is a result obtained from the conversion. The second operand is contained in a vector register specified using vector register ($V_2$) field 506 and is, for instance, a value to be converted. In one example, each of vector register fields 504, 506 is used with RXB field 512 to designate the vector register. In another embodiment, a vector register field is used to designate one or more vector registers.

In one example, $M_4$ field 508 specifies the source data type. Example data types include, for instance:

| $M_4$ | Source Data Type |
|---|---|
| 0 | Neural Network Processing-data-type-1 |
| 1-15 | Reserved |

If a reserved value is specified, an IEEE-inexact exception is recognized.

In one example, $M_3$ field 510 specifies the target data type. Example data types include, for instance:

| $M_3$ | Target Data Type |
|---|---|
| 0-1 | Reserved |
| 2 | Binary Floating Point short format |
| 3-15 | Reserved |

If a reserved value is specified, an IEEE-inexact exception is recognized.

In one embodiment, if the combination of non-reserved $M_3$ and $M_4$ values is not supported by the model (e.g., the select machine or processor of a particular model), an IEEE-inexact exception is recognized, in one example. For instance, the IEEE-inexact exception flag, also referred to herein as an indicator, is set, e.g., to one. If an IEEE-inexact exception is recognized, the first operand is, e.g., unpredictable. In one example, the first operand is set to a default value (e.g., zeros, the value to be converted, or another value). In other embodiments, the IEEE-inexact exception is recognized only for certain invalid data types, such as an invalid machine-specific data type (e.g., NNP-data-type-1), but not for other data types, such as an invalid standard data type (e.g., a binary floating-point format). Other examples are also possible. Further, in one embodiment, if the IEEE-inexact exception is recognized for only certain invalid data types (e.g., invalid machine-specific data types) and not other invalid data types (e.g., invalid standard types), then a specification exception may be recognized for the other invalid data types. Other variations are possible.

Although particular values and formats are provided as examples for the source and target data types, additional, fewer and/or other values and/or formats may be used.

In execution of one embodiment of the Vector Floating Point Convert and Lengthen From Neural Network Processing High instruction, the values of the specified source data type elements in the leftmost half of the second operand are converted to the specified target format and placed in the corresponding double-wide elements in the first operand. The rightmost half of the second operand is ignored. The format of the second operand elements is specified by the source data type in the $M_4$ field. The format of the first operand elements is specified by the target data type in the $M_3$ field.

As an example, $M_4$ specifies the Neural Network Processing-data-type-1 data type, and the values in the second operand that are in the NNP-data-type-1 data format are converted to the binary floating-point short format (specified by $M_3$) and the result is placed in the first operand. The conversion includes, for instance:

Second Operand Value=Binary $1.1 \times 2^1$=3.0 decimal
In NNP-data-type-1:
Sign=0 (for positive)
Exponent=31+1 (1 is the exponent in $2^1$)=32=100000
Mantissa=1.100000000 (fractional part of binary number (e.g., 0.1) with 9 bits of precision; note—the leading "1." is implied and therefore, removed when placed in the actual NNP-data-type-1 format number)
This provides 0 100000 100000000 in binary
0x4100 (100000100000000 converted to hex)
In short binary floating point:
Sign=0 (for positive)
Exponent=127+1=128=10000000
Mantissa=0.10000000000000000000000 (fractional part, 23 bits, with implied "1." also removed)
In hex: 0x40400000

In execution of one embodiment of the instruction, the condition code remains unchanged. Possible IEEE exceptions include invalid operation and inexact.

Example results of the Vector Floating Point Convert and Lengthen From NNP High/Low instructions are indicated below:

| Operand Element (a) | Invalid-Op. Mask (FPC 0.0) | Results |
|---|---|---|
| −Nmax ≤ v ≤ −Nmin | — | T(v) |
| −0 | — | T(−0) |
| +0 | — | T(+0) |
| Nmin ≤ v ≤ Nmax | — | T(v) |
| ±NINF | 0 | T(dNaN), SF←1 |
| ±NINF | 1 | PIV(1) |

Where:

| | |
|---|---|
| — | The results do not depend on this condition or mask bit. |
| Nmax | Maximum positive number representable in the source format. |
| Nmin | Smallest positive number representable in the source format. |
| PIV(h) | Program interruption for vector-processing exception with VXC (Vector Exception Code) containing the element index and a VIC (Vector Index) of h in hex. |
| v | Precise intermediate floating-point value which is the source value (a). |
| SFi | IEEE invalid-operation flag, FPC (Floating-Point Control Register) 1.0. |
| dNAN | Default NaN. |
| T(x) | The value x is converted to the target format and placed at the target operand element location. |

Figure 5B:
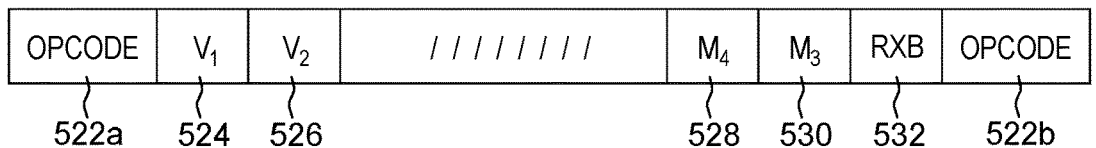
FIG. 5B depicts one example of a format of a Vector Floating Point Convert and Lengthen From Neural Network Processing Low instruction, in accordance with one or more aspects of the present invention.

Another example of a conversion instruction is a Vector Floating Point Convert and Lengthen From Neural Network Processing Low instruction. As depicted in FIG. 5B, a Vector Floating Point Convert and Lengthen From Neural Network Processing Low instruction 520 has a VRR format indicating a vector register to register operand with an extended opcode. It includes, for instance, operation code (opcode) fields 522a, 522b (e.g., bits 0-7 and 40-47) indicating a conversion to be performed; a first vector register ($V_1$) field 524 (e.g., bits 8-11) used to designate a first vector register; a second vector register ($V_2$) field 526 (e.g., bits 12-15) used to designate a second vector register; a first mask ($M_4$) field 528 (e.g., bits 28-31); a second mask ($M_3$) field 530 (e.g., bits 32-35); and a register extension bit (RXB) field 532 (e.g., bits 36-39), each of which is described herein. In one embodiment, the fields are separate and independent from one another; however, in other embodiments, more than one field may be combined. Further information regarding these fields is described below.

In one embodiment, vector register ($V_1$) field 524 is used to indicate a vector register that is to store the first operand. The first operand is a result obtained from the conversion. The second operand is contained in a vector register specified using vector register ($V_2$) field 526 and includes, for instance, a value to be converted. In one example, each of vector register fields 524, 526 is used with RXB field 532 to designate the vector register. In another embodiment, a vector register field is used to designate one or more vector registers.

In one example, $M_4$ field 528 specifies the source data type. Example data types include, for instance:

| $M_4$ | Source Data Type |
|---|---|
| 0 | Neural Network Processing-data-type-1 |
| 1-15 | Reserved |

If a reserved value is specified, an IEEE-inexact exception is recognized.

In one example, $M_3$ field 530 specifies the target data type. Example data types include, for instance:

| $M_3$ | Target Data Type |
|---|---|
| 0-1 | Reserved |
| 2 | Binary Floating Point short format |
| 3-15 | Reserved |

If a reserved value is specified, an IEEE-inexact exception is recognized.

In one embodiment, if the combination of non-reserved $M_3$ and $M_4$ values is not supported by the model (e.g., the select machine or processor of a particular model), an IEEE-inexact exception is recognized, in one example. For instance, the IEEE-inexact exception flag, also referred to herein as an indicator, is set, e.g., to one. If an IEEE-inexact exception is recognized, the first operand is, e.g., unpredictable. In one example, the first operand is set to a default value (e.g., zeros, the value to be converted, or another value). In other embodiments, the IEEE-inexact exception is recognized only for certain invalid data types, such as an invalid machine-specific data type (e.g., NNP-data-type-1), but not for other data types, such as an invalid standard data type (e.g., a binary floating-point format). Other examples are also possible. Further, in one embodiment, if the IEEE-inexact exception is recognized for only certain invalid data types (e.g., invalid machine-specific data types) and not other invalid data types (e.g., invalid standard types), then a specification exception may be recognized for the other invalid data types. Other variations are possible.

Although particular values and formats are provided as examples for the source and target data types, additional, fewer and/or other values and/or formats may be used.

In execution of one embodiment of the Vector Floating Point Convert and Lengthen From Neural Network Processing Low instruction, the values of the specified source data type elements in the rightmost half of the second operand and extended with zeros are converted to the specified target format and placed in the corresponding double-wide elements in the first operand. The leftmost half of the second operand is ignored. The format of the second operand elements is specified by the source data type in the $M_4$ field. The format of the first operand elements is specified by the target data type in the $M_3$ field.

In execution of one embodiment of the instruction, the condition code remains unchanged. Possible IEEE exceptions include invalid operation and inexact. Example results of the Vector Floating Point Convert and Lengthen From NNP Low instruction are indicated above.

Figure 5C:
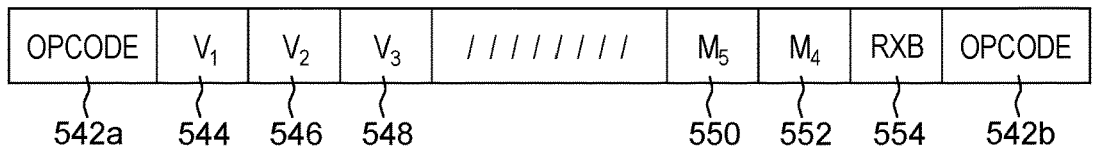
FIG. 5C depicts one example of a format of a Vector Floating Point Convert and Round To Neural Network Processing instruction, in accordance with one or more aspects of the present invention.

Another example of a conversion instruction is a Vector Floating Point Convert and Round to Neural Network Processing instruction. As depicted in FIG. 5C, a Vector Floating Point Convert and Round to Neural Network Processing instruction 540 has a VRR format indicating a vector register to register operand with an extended opcode. It includes, for instance, operation code (opcode) fields 542a, 542b (e.g., bits 0-7 and 40-47) indicating a conversion is to be performed, as well as rounding; a first vector register ($V_1$) field 544 (e.g., bits 8-11) used to designate a first vector register; a second vector register ($V_2$) field 546 (e.g., bits 12-15) used to designate a second vector register; a third vector register ($V_3$) field 548 (e.g., bits 16-19) used to designate a third vector register; a first mask ($M_5$) field 550 (e.g., bits 28-31); a second mask ($M_4$) field 552 (e.g., bits 32-35); and a register extension bit (RXB) field 554 (e.g., bits 36-39), each of which is described herein. In one embodiment, the fields are separate and independent from one another; however, in other embodiments, more than one field may be combined. Further information regarding these fields is described below.

In one embodiment, vector register ($V_1$) field 544 is used to indicate a vector register that is to store the first operand. The first operand is a result obtained from the conversion and rounding. The second operand contained in a vector register specified using vector register ($V_2$) field 546 and the third operand contained in a vector register specified using vector register ($V_3$) field 548 are concatenated to create a source vector. In one example, each of vector register fields 544, 546, 548 is used with RXB field 554 to designate the vector register. In another embodiment, a vector register field is used to designate one or more vector registers.

In one example, $M_5$ field 550 specifies the source data type. Example data types include, for instance:

| $M_5$ | Source Data Type |
|---|---|
| 0-1 | Reserved |
| 2 | Binary Floating Point short format |
| 3-15 | Reserved |

If a reserved value is specified, an IEEE-inexact exception is recognized.

In one example, $M_4$ field 552 specifies the target data type. Example data types include, for instance:

| $M_4$ | Target Data Type |
|---|---|
| 0 | Neural Network Processing-data-type-1 |
| 1-15 | Reserved |

If a reserved value is specified, an IEEE-inexact exception is recognized.

In one embodiment, if the combination of non-reserved $M_4$ and $M_5$ values is not supported by the model (e.g., the select machine or processor of a particular model), an IEEE-inexact exception is recognized, in one example. For instance, the IEEE-inexact exception flag, also referred to herein as an indicator, is set, e.g., to one. If an IEEE-inexact exception is recognized, the first operand is, e.g., unpredictable. In one example, the first operand is set to a default value (e.g., zeros, the value to be converted, or another value). In other embodiments, the IEEE-inexact exception is recognized only for certain invalid data types, such as an invalid machine-specific data type (e.g., NNP-data-type-1), but not for other data types, such as an invalid standard data type (e.g., a binary floating-point format). Other examples are also possible. Further, in one embodiment, if the IEEE-inexact exception is recognized for only certain invalid data types (e.g., invalid machine-specific data types) and not other invalid data types (e.g., invalid standard types), then a specification exception may be recognized for the other invalid data types. Other variations are possible.

Although particular values and formats are provided as examples for the source and target data types, additional, fewer and/or other values and/or formats may be used.

In execution of one embodiment of the Vector Floating Point Convert and Round to Neural Network Processing instruction, a source vector is created from the concatenation of the second operand followed by the third operand. In a left to right fashion, the source data type elements of the source vector are rounded to the precision and converted to the format of a target data type number. The half-sized target data type number is placed in the corresponding element of the vector register specified first operand. In accordance with an aspect of the present invention, the rounding mode used for rounding is based on the machine-specific data type of the target data type. Thus, in one example, the rounding mode is the mode assigned to the Neural Network Processing-data-type-1, since this is the machine-specific data type specified for use in the conversion by the instruction. If another data type is selected, the rounding mode is the rounding mode assigned to that other data type.

In execution of one embodiment of the instruction, the condition code remains unchanged. Possible IEEE exceptions include invalid operation, overflow, underflow and inexact.

Example results of the Vector Floating Point Convert and Round to Neural Network Processing instruction are indicated below:

| Operand Element (a) | Invalid Op. Mask (FPC 0.0) | Overflow Mask (FPC 0.2) | Underflow Mask (FPC 0.3) | Results |
|---|---|---|---|---|
| v < −Nmax, g < −Nmax | — | 0 | — | T(−NINF), SFo←1 |
| v < −Nmax, g < −Nmax | — | 1 | — | PIV(3) |
| v < −Nmax, g = −Nmax | — | — | — | T(−Nmax) |
| −Nmax ≤ v ≤ −Nmin | — | — | — | T(g) |
| −Nmin < v < 0, g < −Nmin | — | — | 0 | T(−0), SFu←1 |
| −Nmin < v < 0, g < −Nmin | — | — | 1 | PIV(4) |
| −Nmin < v < 0, g = −Nmin | — | — | 0 | −Nmin, SFu←1 |
| −Nmin < v < 0, g = −Nmin | — | — | 1 | PIV(4) |
| −0 | — | — | — | T(−0) |
| +0 | — | — | — | T(+0) |
| 0 < v < Nmin, g < Nmin | — | — | 0 | T(+0), SFu←1 |
| 0 < v < Nmin, g < Nmin | — | — | 1 | PIV(4) |
| 0 < v < Nmin, g = Nmin | — | — | 0 | T(+Nmin), SFu←1 |
| 0 < v < Nmin, g = Nmin | — | — | 1 | PIV(4) |
| Nmin ≤ v ≤ Nmax | — | — | — | T(g) |
| Nmax < v, g = Nmax | — | — | — | T(+Nmax) |
| Nmax < v, g > Nmax | — | 0 | — | T(±NINF[1]), SFo←1 |
| Nmax < v, g > Nmax | — | 1 | — | PIV(3) |
| ±∞ | — | 0 | — | T(±NINF[1]), SFo←1 |
| ±∞ | — | 1 | — | PIV(3) |
| ±NaN | 0 | — | — | T(±NINF[1]), SFi←1 |
| ±NaN | 1 | — | — | PIV(1) |

Where:

| | |
|---|---|
| 1 | The sign bit of the result is the same as the sign bit of the source. |
| — | The results do not depend on this condition or mask bit. |
| Nmax | Maximum positive number representable in the target format. |
| Nmin | Smallest positive number representable in the target format. |
| PIV(h) | Program interruption for vector-processing exception with VXC (Vector Exception Code) containing the element index and a VIC (Vector Index) of h in hex. |
| v | Precise intermediate floating-point value which is the source value (a). |
| g | The precision-rounded value. The value derived when the precise intermediate value (v) is rounded to the precision of the target, but assuming an unbounded exponent range. The rounding mode used is round to nearest with ties away from 0. |
| SFi | IEEE invalid-operation flag, FPC (Floating-Point Control Register) 1.0. |
| SFo | IEEE overflow flag, FPC 1.2. |
| SFu | IEEE underflow flag, FPC 1.3. |
| T(x) | The value x is converted to the target format and placed at the target operand element location. |

Figure 5D:
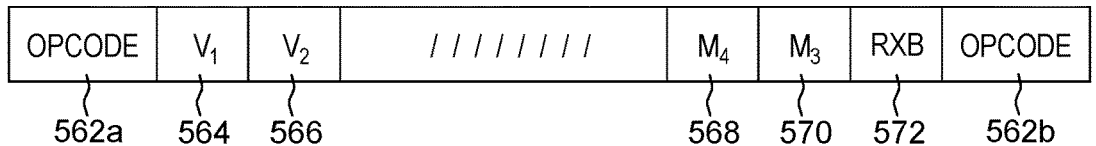
FIG. 5D depicts one example of a format of a Vector Floating Point Convert From Neural Network Processing instruction, in accordance with one or more aspects of the present invention.

Another example of a conversion instruction is a Vector Floating Point Convert From Neural Network Processing instruction. As depicted in FIG. 5D, a Vector Floating Point Convert From Neural Network Processing instruction 560 has a VRR format indicating a vector register to register operand with an extended opcode. It includes, for instance, operation code (opcode) fields 562a, 562b (e.g., bits 0-7 and 40-47) indicating a conversion is to be performed; a first vector register ($V_1$) field 564 (e.g., bits 8-11) used to designate a first vector register; a second vector register ($V_2$) field 566 (e.g., bits 12-15) used to designate a second vector register; a first mask ($M_4$) field 568 (e.g., bits 28-31); a second mask ($M_3$) field 570 (e.g., bits 32-35); and a register extension bit (RXB) field 572 (e.g., bits 36-39), each of which is described herein. In one embodiment, the fields are separate and independent from one another; however, in other embodiments, more than one field may be combined. Further information regarding these fields is described below.

In one embodiment, vector register ($V_1$) field 564 is used to indicate a vector register that is to store the first operand. The first operand is a result obtained from the conversion to be performed. The second operand is contained in a vector register specified using vector register ($V_2$) field 566. In one example, each of vector register fields 564, 566 is used with RXB field 572 to designate the vector register. In another embodiment, a vector register field is used to designate one or more vector registers.

In one example, $M_4$ field 568 specifies the source data type. Example data types include, for instance:

| $M_4$ | Source Data Type |
|---|---|
| 0 | Neural Network Processing-data-type-1 |
| 1-15 | Reserved |

If a reserved value is specified, an IEEE-inexact exception is recognized.

In one example, $M_3$ field 570 specifies the target data type. Example data types include, for instance:

| $M_3$ | Target Data Type |
|---|---|
| 0 | Reserved |
| 1 | Binary Floating Point tiny format |
| 2-15 | Reserved |

If a reserved value is specified, an IEEE-inexact exception is recognized.

In one embodiment, if the combination of non-reserved $M_3$ and $M_4$ values is not supported by the model (e.g., the select machine or processor of a particular model), an IEEE-inexact exception is recognized, in one example. For instance, the IEEE-inexact exception flag, also referred to herein as an indicator, is set, e.g., to one. If an IEEE-inexact exception is recognized, the first operand is, e.g., unpredictable. In one example, the first operand is set to a default value (e.g., zeros, the value to be converted, or another value). In other embodiments, the IEEE-inexact exception is recognized only for certain invalid data types, such as an invalid machine-specific data type (e.g., NNP-data-type-1), but not for other data types, such as an invalid standard data type (e.g., a binary floating-point format). Other examples are also possible. Further, in one embodiment, if the IEEE-inexact exception is recognized for only certain invalid data types (e.g., invalid machine-specific data types) and not other invalid data types (e.g., invalid standard types), then a specification exception may be recognized for the other invalid data types. Other variations are possible.

Although particular values and formats are provided as examples for the source and target data types, additional, fewer and/or other values and/or formats may be used.

In execution of one embodiment of the Vector Floating Point Convert From Neural Network Processing instruction, the specified source data type elements of the second operand are rounded to the precision of a target data type number. The result is converted to the specified target data type and placed in the corresponding element of the first operand location. In accordance with an aspect of the present invention, the rounding mode used for rounding is based on the machine-specific data type of the source data type. Thus, in one example, the rounding mode is the mode assigned to the Neural Network Processing-data-type-1, since this is the machine-specific data type specified for use in the conversion by the instruction. If another data type is selected, the rounding mode is the rounding mode assigned to that other data type.

In execution of one embodiment of the instruction, the condition code remains unchanged. Possible IEEE exceptions include invalid operation, overflow, underflow and inexact.

Example Results of a Vector Floating Point Convert From Neural Network Processing is indicated below:

| | | |
|---|---|
| Dmin | Smallest (in magnitude) representable subnormal number in the target format. |
| Nmax | Largest (in magnitude) representable finite number in the target format. |
| Nmin | Smallest (in magnitude) representable normal number in the target format. |
| PIV(h) | Program interruption for vector-processing exception with VXC (Vector Exception Code) containing the element index and a VIC (Vector Index) of h in hex. |
| v | Precise intermediate floating-point value which is the source value (a). |
| g | The precision-rounded value. The value derived when the precise intermediate value (v) is rounded to the precision of the target, but assuming an unbounded exponent range. The rounding mode used is round to nearest with ties away from 0. |
| SFi | IEEE invalid-operation flag, FPC (Floating-Point Control Register) 1.0. |
| SFo | IEEE overflow flag, FPC 1.2. |
| SFu | IEEE underflow flag, FPC 1.3. |
| dNaN | Default NaN. |
| T(x) | The value x is converted to the target format and placed at the target operand element location. |

Figure 5E:
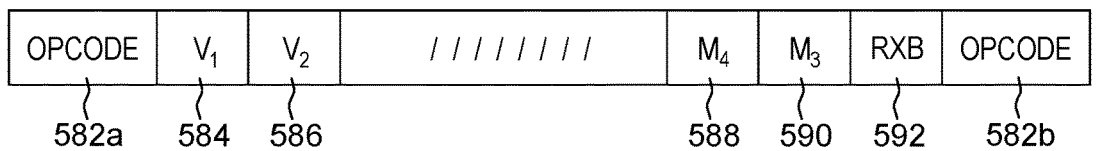
FIG. 5E depicts one example of a format of a Vector Floating Point Convert To Neural Network Processing instruction, in accordance with one or more aspects of the present invention.

Another example of a conversion instruction is a Vector Floating Point Convert To Neural Network Processing instruction. As depicted in FIG. 5E, a Vector Floating Point Convert to Neural Network Processing instruction 580 has a VRR format indicating a vector register to register operand with an extended opcode. It includes, for instance, operation code (opcode) fields 582a, 582b (e.g., bits 0-7 and 40-47) indicating a conversion to be performed; a first vector register ($V_1$) field 584 (e.g., bits 8-11) used to designate a first vector register; a second vector register ($V_2$) field 586

| Operand Element (a) | Invalid Op. Mask (FPC 0.0) | Overflow Mask (FPC 0.2) | Underflow Mask (FPC 0.3) | Results |
|---|---|---|---|---|
| v < −Nmax | — | 0 | — | T(−∞), SFo←1 |
| v < −Nmax | — | 1 | — | PIV(3) |
| −Nmax ≤ v ≤ −Nmin | — | — | — | (T(g) |
| −Nmin < v ≤ −Dmin, g = −Nmin | — | — | 0 | T(−Nmin), SFu←1 |
| −Nmin < v ≤ −Dmin, g = −Nmin | — | — | 1 | PIV(4) |
| −Nmin < v ≤ −Dmin, g < −Nmin | — | — | 0 | T(d), SFu←1 |
| −Nmin < v ≤ −Dmin, g < −Nmin | — | — | 1 | PIV(4) |
| −Dmin < v ≤ −Dmin/2 | — | — | 0 | T(−Dmin), SFu←1 |
| −Dmin < v ≤ −Dmin/2 | — | — | 1 | PIV(4) |
| −Dmin/2 < v < 0 | — | — | 0 | T(−0), SFu←1 |
| −Dmin/2 < v < 0 | — | — | 1 | PIV(4) |
| −0 | — | — | — | T(−0) |
| +0 | — | — | — | T(+0) |
| 0 < v < Dmin/2 | — | — | 0 | T(+0), SFu←1 |
| 0 < v < Dmin/2 | — | — | 1 | PIV(4) |
| Dmin/2 ≤ v < Dmin | — | — | 0 | T(+Dmin), SFu←1 |
| Dmin/2 ≤ v < Dmin | — | — | 1 | PIV(4) |
| Dmin ≤ v < Nmin, g < Nmin | — | — | 0 | T(d), SFu←1 |
| Dmin ≤ v < Nmin, g < Nmin | — | — | 1 | PIV(4) |
| Dmin ≤ v < Nmin, g = Nmin | — | — | 0 | T(+Nmin), SFu←1 |
| Dmin ≤ v < Nmin, g + Nmin | — | — | 1 | PIV(4) |
| Nmin ≤ v ≤ Nmax | — | — | — | T(g) |
| Nmax < v | — | 0 | — | T(+∞), SFo←1 |
| Nmax < v | — | 1 | — | PIV(3) |
| +NINF | 0 | — | — | T(dNaN), SFi←1 |
| −NINF | 1 | — | — | PIV(1) |

Where:

| | |
|---|---|
| — | The results do not depend on this condition or mask bit. |
| d | The denormalized value. The value derived when the precise intermediate value(v) is rounded to the format of the target, including both precision and bounded exponent range |

(e.g., bits 12-15) used to designate a second vector register; a first mask ($M_4$) field 588 (e.g., bits 28-31); a second mask ($M_3$) field 590 (e.g., bits 32-35); and a register extension bit (RXB) field 592 (e.g., bits 36-39), each of which is described herein. In one embodiment, the fields are separate and independent from one another; however, in other embodiments, more than one field may be combined. Further information regarding these fields is described below.

In one embodiment, vector register ($V_1$) field 584 is used to indicate a vector register that is to store the first operand. The first operand is a result obtained from the conversion. The second operand is contained in a vector register specified using vector register ($V_2$) field 586. In one example, each of vector register fields 584, 586 is used with RXB field 592 to designate the vector register. In another embodiment, a vector register field is used to designate one or more vector registers.

In one example, $M_4$ field 588 specifies the source data type. Example data types include, for instance:

| $M_4$ | Source Data Type |
|---|---|
| 0 | Reserved |
| 1 | Binary Floating Point tiny format |
| 2-15 | Reserved |

If a reserved value is specified, an IEEE-inexact exception is recognized.

In one example, $M_3$ field 590 specifies the target data type. Example data types include, for instance:

| $M_3$ | Target Data Type |
|---|---|
| 0 | Neural Network Processing-data-type-1 |
| 1-15 | Reserved |

If a reserved value is specified, an IEEE-inexact exception is recognized.

In one embodiment, if the combination of non-reserved $M_3$ and $M_4$ values is not supported by the model (e.g., the select machine or processor of a particular model), an IEEE-inexact exception is recognized, in one example. For instance, the IEEE-inexact exception flag, also referred to herein as an indicator, is set, e.g., to one. If an IEEE-inexact exception is recognized, the first operand is, e.g., unpredictable. In one example, the first operand is set to a default value (e.g., zeros, the value to be converted, or another value). In other embodiments, the IEEE-inexact exception is recognized only for certain invalid data types, such as an invalid machine-specific data type (e.g., NNP-data-type-1), but not for other data types, such as an invalid standard data type (e.g., a binary floating-point format). Other examples are also possible. Further, in one embodiment, if the IEEE-inexact exception is recognized for only certain invalid data types (e.g., invalid machine-specific data types) and not other invalid data types (e.g., invalid standard types), then a specification exception may be recognized for the other invalid data types. Other variations are possible.

Although particular values and formats are provided as examples for the source and target data types, additional, fewer and/or other values and/or formats may be used.

In execution of one embodiment of the Vector Floating Point Convert to Neural Network Processing instruction, the binary floating-point elements of the second operand are rounded to the precision of the target data type number. The result is converted to the target data type and placed in the corresponding element of the first operand location. In accordance with an aspect of the present invention, the rounding mode used for rounding is based on the machine-specific data type of the target data type. Thus, in one example, the rounding mode is the mode assigned to the Neural Network Processing-data-type-1, since this is the machine-specific data type specified for use in the conversion by the instruction. If another data type is selected, the rounding mode is the rounding mode assigned to that other data type.

In one execution of one embodiment of the instruction, the condition code remains unchanged. Possible IEEE exceptions include invalid operation, overflow and inexact.

Example results of a Vector Floating Point Convert To Neural Network Processing is indicated below:

| Operand Element (a) | Invalid Op. Mask (FPC 0.0) | Overflow Mask (FPC 0.2) | Results |
|---|---|---|---|
| $-Nmax \leq v < -Nmin$ | — | — | T(g) |
| $-Nmin \leq v \leq -Dmin$ | — | — | T(v) |
| $-0$ | — | — | T(-0) |
| $+0$ | — | — | T(+0) |
| $Dmin \leq v \leq Nmin$ | — | — | T(v) |
| $Nmin < v \leq Nmax$ | — | — | T(g) |
| $+\infty$ | — | 0 | T(±NINF), SFo←1 |
| $+\infty$ | — | 1 | PIV(3) |
| $+NaN$ | 0 | — | T(±NINF), SFi←1 |
| $+NaN$ | 1 | — | PIV(1) |

Where:

| | |
|---|---|
| — | The results do not depend on this condition or mask bit. |
| Dmin | Smallest (in magnitude) representable subnormal number in the source format. |
| Nmax | Largest (in magnitude) representable subnormal number in the source format. |
| Nmin | Smallest (in magnitude) representable normal number in the source format. |
| PIV(h) | Program interruption for vector-processing exception with VXC (Vector Exception Code) containing the element index and a VIC (Vector Index) of h in hex. |
| v | Precise intermediate floating-point value which is the source value (a). |
| g | The precision-rounded value. The value derived when the precise intermediate value (v) is rounded to the precision of the target, but assuming an unbounded exponent range. The rounding mode used in round to nearest with ties away from 0. |
| SFi | IEEE invalid-operation flag, FPC (Floating-Point Control Register) 1.0. |
| SFo | IEEE overflow flag, FPC 1.2. |
| T(x) | The value x is converted to the target format and placed at the target operand element location. |

One or more of the above conversion instructions is used, in accordance with one or more aspects of the present invention, to provide data to a processor of a select machine model in a format, e.g., optimized for that processor/machine model, such that the processor of that machine model can perform functions using that data. The processor of that machine model provides output in that data type, which may then be converted using one or more of the above conversion instructions to a standard data type or other data type for use by programs and/or other processors.

In one example, data is converted by, e.g., a general-purpose processor, from a standard data type (e.g., a binary floating-point format) to a machine-specific data type (e.g., NNP-data-type-1, etc.) of a select processor (e.g., a special-purpose processor) of a particular machine model. One or more functions are performed by the select processor using the converted data. When performance of the one or more functions is complete, the converted data, in e.g., the machine-specific format, is converted back to the standard format by, e.g., a general-purpose processor, for use, e.g., by the general-purpose processor, other processors and/or other processing.

As one example, the select processor is a co-processor, such as a neural network processor (e.g., neural network processor 31) used to perform, e.g., tensor computations and/or other operations, and data converted to the NNP-data-type-1 format, as an example, is provided to the select processor via, for instance, an instruction, such as a Neural Network Processing Assist instruction, an example of which is described below.

One example of the Neural Network Processing Assist instruction is described with reference to FIG. 6A. In one example, the instruction is initiated on a general-purpose processor (e.g., processor 13) and a function specified by the instruction is either executed on the general-purpose processor and/or a special-purpose processor (e.g., neural network processor 31) depending on the function. The instruction then completes on the general-purpose processor. In other examples, the instruction is initiated, executed and completed on one or more general-purpose processors or one or more special-purpose processors. Other variations are possible. In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

Figure 6A:
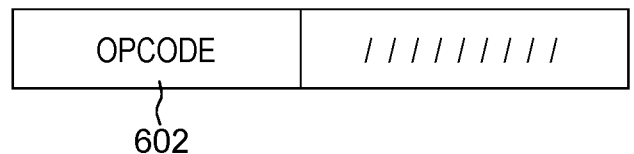
FIG. 6A depicts one example of a format of a Neural Network Processing Assist instruction used in accordance with one or more aspects of the present invention.

In one example, referring to FIG. 6A, a Neural Network Processing Assist instruction 600 has an RRE format that denotes a register and register operation with an extended operation code (opcode). As shown in FIG. 6A, in one example, Neural Network Processing Assist instruction 600 includes an operation code (opcode) field 602 (e.g., bits 0-15) indicating a neural network processing assist operation. In one example, bits 16-31 of the instruction are reserved and are to contain zeros.

In one example, the instruction uses a plurality of general registers implicitly specified by the instruction. For instance, Neural Network Processing Assist instruction 600 uses implied registers general register 0 and general register 1, examples of which are described with reference to FIGS. 6B and 6D, respectively.

Figure 6B:
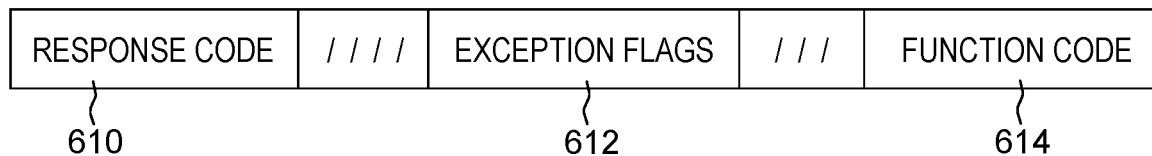
FIG. 6B depicts one example of a general register used by the Neural Network Processing Assist instruction, in accordance with one or more aspects of the present invention.

Referring to FIG. 6B, in one example, general register 0 includes a function code field, and status fields which may be updated upon completion of the instruction. As an example, general register 0 includes a response code field 610 (e.g., bits 0-15), an exception flags field 612 (e.g., bits 24-31) and a function code field 614 (e.g., bits 56-63). Further, in one example, bits 16-23 and 32-55 of general register 0 are reserved and are to contain zeros. One or more fields are used by a particular function performed by the instruction. Not all fields are used by all of the functions, in one example. Each of the fields is described below:

Response Code (RC) 610: This field (e.g., bit positions 0-15) contains the response code. When execution of the Neural Network Processing Assist instruction completes with a condition code of, e.g., one, a response code is stored. When an invalid input condition is encountered, a non-zero value is stored to the response code field, which indicates the cause of the invalid input condition recognized during execution and a selected condition code, e.g., 1, is set. The codes stored to the response code field are defined, as follows, in one example:

| Response Code | Meaning |
| --- | --- |
| 0001 | The format of the parameter block, as specified by the parameter block version number, is not supported by the model. |
| 0002 | The specified function is not defined or installed on the machine. |
| 0010 | A specified tensor data layout format is not supported. |
| 0011 | A specified tensor data type is not supported. |
| 0012 | A specified single tensor dimension is greater than the maximum dimension index size. |
| 0013 | The size of a specified tensor is greater than the maximum tensor size. |
| 0014 | The specified tensor address is not aligned on a 4K-byte boundary. |
| 0015 | The function-specific-save-area-address is not aligned on a 4K-byte boundary. |
| F000-FFFF | Function specific response codes. These response codes are defined for certain functions. |

Exception Flags (EF) 612: This field (e.g., bit positions 24-31) includes the exception flags. If an exception condition is detected during execution of the instruction, the corresponding exception flag control (e.g., bit) will be set to, e.g., one; otherwise, the control remains unchanged. The exception flags field is to be initialized to zero prior to the first invocation of the instruction. Reserved flags are unchanged during execution of the instruction. The flags stored to the exception flags field are defined as follows, in one example:

| EF (Bit) | Meaning |
| --- | --- |
| 0 | Range Violation. This flag is set when a non-numeric value was either detected in an input tensor or stored to the output tensor. This flag is, e.g., only valid when the instruction completes with condition code, e.g., 0. |
| 1-7 | Reserved. |

Function Code (FC) 614: This field (e.g., bit positions 56-63) includes the function code. Examples of assigned function codes for the Neural Network Processing Assist instruction are depicted in FIG. 6C. All other function codes are unassigned. If an unassigned or uninstalled function code is specified, a response code of, e.g., 0002 hex and a select condition code, e.g., 1, are set. This field is not modified during execution.

As indicated, in addition to general register 0, the Neural Network Processing Assist instruction also uses general register 1, an example of which is depicted in FIG. 6D. As examples, bits 40-63 in the 24-bit addressing mode, bits 33-63 in the 31-bit addressing mode or bits 0-63 in the 64-bit addressing mode include an address of a parameter block 620. The contents of general register 1 specify, for instance, a logical address of a leftmost byte of the parameter block in storage. The parameter block is to be designated on a doubleword boundary; otherwise, a specification exception is recognized. For all functions, the contents of general register 1 are not modified.

In the access register mode, access register 1 specifies an address space containing the parameter block, input tensors, output tensors and the function specific save area, as an example.

In one example, the parameter block may have different formats depending on the function specified by the instruction to be performed. For instance, the query function has a parameter block of one format and other functions of the instruction have a parameter block of another format. In another example, all functions use the same parameter block format. Other variations are also possible.

As examples, a parameter block and/or the information in the parameter block is stored in memory, in hardware registers and/or in a combination of memory and/or registers. Other examples are also possible.

One example of a parameter block used by a query function, such as the NNPA-Query Available Functions (QAF) operation, is described with reference to FIG. 6E. As shown, in one example, a NNPA-Query Available Functions parameter block 630 includes, for instance:

Installed Functions Vector 632: This field (e.g., bytes 0-31) of the parameter block includes the installed functions vector. In one example, bits 0-255 of the installed functions vector correspond to function codes 0-255, respectively, of the Neural Network Processing Assist instruction. When a bit is, e.g., one, the corresponding function is installed; otherwise, the function is not installed.

Installed Parameter Block Formats Vector 634: This field (e.g., bytes 32-47) of the parameter block includes the installed parameter block formats vector. In one example, bits 0-127 of the installed parameter block formats vector correspond to parameter block formats 0-127 for the non-query functions of the Neural Network Processing Assist instruction. When a bit is, e.g., one, the corresponding parameter block format is installed; otherwise, the parameter block format is not installed.

Installed Data Types 636: This field (e.g., bytes 48-49) of the parameter block includes the installed data types vector. In one example, bits 0-15 of the installed data types vector correspond to the data types being installed. When a bit is, e.g., one, the corresponding data type is installed; otherwise, the data type is not installed. Example data types include (additional, fewer and/or other data types are possible):

| Bit | Data Type |
| --- | --- |
| 0 | NNP-data-type-1 |
| 1-15 | Reserved |

Installed Data Layout Formats 638: This field (e.g., bytes 52-55) of the parameter block includes the installed data layout formats vector. In one example, bits 0-31 of the installed data layout formats vector correspond to data layout formats being installed. When a bit is, e.g., one, the corresponding data layout format is installed; otherwise, the data layout format is not installed. Example data layout formats include (additional, fewer and/or other data layout formats are possible):

| Bit | Data Layout Format |
| --- | --- |
| 0 | 4D-feature tensor |
| 1 | 4D-kernel tensor |
| 2-31 | Reserved |

Maximum Dimension Index Size 640: This field (e.g., bytes 60-63) of the parameter block includes, e.g., a 32-bit unsigned binary integer that specifies a maximum number of elements in a specified dimension index size for any specified tensor. In another example, the maximum dimension index size specifies a maximum number of bytes in a specified dimension index size for any specified tensor. Other examples are also possible.

Maximum Tensor Size 642: This field (e.g., bytes 64-71) of the parameter block includes, e.g., a 32-bit unsigned binary integer that specifies a maximum number of bytes in any specified tensor including any pad bytes required by the tensor format. In another example, the maximum tensor size specifies a maximum number of total elements in any specified tensor including any padding required by the tensor format. Other examples are also possible.

Installed-NNP-Data-Type-1-Conversions Vector 644: This field (e.g., bytes 72-73) of the parameter block includes the installed-NNP-Data-Type-1-conversions vector. In one example, bits 0-15 of the installed-NNP-Data-Type-1-conversions vector correspond to installed data type conversion from/to NNP-data-type-1 format. When a bit is one, the corresponding conversion is installed; otherwise, the conversion is not installed. Additional, fewer and/or other conversions may be specified.

| Bit | Data Type |
| --- | --- |
| 0 | Reserved |
| 1 | BFP tiny format |
| 2 | BFP short format |
| 3-15 | Reserved |

In one or more embodiments, an Installed-NNP-Data-Type-Conversions Vector is added to the query parameter block for each machine-specific data type supported. Other variations are possible.

Although one example of a parameter block for a query function is described with reference to FIG. 6E, other formats of a parameter block for a query function, including the NNPA-Query Available Functions operation, may be used. The format may depend, in one example, on the type of query function to be performed. Further, the parameter block and/or each field of the parameter block may include additional, fewer and/or other information.

In addition to the parameter block for a query function, in one example, there is a parameter block format for non-query functions, such as non-query functions of the Neural-Network Processing Assist instruction. One example of a parameter block used by a non-query function, such as a non-query function of the Neural Network Processing Assist instruction, is described with reference to FIG. 6F.

As shown, in one example, a parameter block 650 employed by, e.g., the non-query functions of the Neural Network Processing Assist instruction includes, for instance:

Parameter Block Version Number 652: This field (e.g., bytes 0-1) of the parameter block specifies the version and size of the parameter block. In one example, bits 0-8 of the parameter block version number are reserved and are to contain zeros, and bits 9-15 of the parameter block version number contain an unsigned binary integer specifying the format of the parameter block. The query function provides a mechanism of indicating the parameter block formats available. When the size or format of the parameter block specified is not supported by the model, a response code of, e.g., 0001 hex is stored in general register 0 and the instruction completes by setting a condition code, e.g., condition code 1. The parameter block version number is specified by the program and is not modified during the execution of the instruction.

Model Version Number 654: This field (e.g., byte 2) of the parameter block is an unsigned binary integer identifying the model which executed the instruction (e.g., the particular non-query function). When a continuation flag (described below) is one, the model version number may be an input to the operation for the purpose of interpreting the contents of a continuation state buffer field (described below) of the parameter block to resume the operation.

Continuation Flag 656: This field (e.g., bit 63) of the parameter block, when, e.g., one, indicates the operation is partially complete and the contents of the continuation state buffer may be used to resume the operation. The program is to initialize the continuation flag to zero and not modify the continuation flag in the event the instruction is to be re-executed for the purpose of resuming the operation; otherwise, results are unpredictable.

If the continuation flag is set at the beginning of the operation and the contents of the parameter block have changed since the initial invocation, results are unpredictable.

Function-specific-save-area-address 658: This field (e.g., bytes 56-63) of the parameter block includes the logical address of the function specific save area. In one example, the function-specific-save-area-address is to be aligned on a 4 K-byte boundary; otherwise, a response code of, e.g., 0015 hex is set in general register 0 and the instruction completes with a condition code of, e.g., 1. The address is subject to the current addressing mode. The size of the function specific save area depends on the function code.

When the entire function specific save area overlaps the program event recording (PER) storage area designation, a PER storage alteration event is recognized, when applicable, for the function specific save area. When only a portion of the function specific save area overlaps the PER storage area designation, it is model-dependent which of the following occurs:

A PER storage alteration event is recognized, when applicable, for the entire function specific save area.
A PER storage alteration event is recognized, when applicable, for the portion of the function specific save area that is stored.

When the entire parameter block overlaps the PER storage area designation, a PER storage alteration event is recognized, when applicable, for the parameter block. When only a portion of the parameter block overlaps the PER storage area designation, it is model-dependent which of the following occurs:

A PER storage alteration event is recognized, when applicable, for the entire parameter block.
A PER storage alteration event is recognized, when applicable, for the portion of the parameter block that is stored.

A PER zero-address detection event is recognized, when applicable, for the parameter block. Zero address detection does not apply to the tensor addresses or the function-specific-save-area-address, in one example.

Output Tensor Descriptors (e.g., 1-2) 660/Input Tensor Descriptors (e.g., 1-3) 665: One example of a tensor descriptor is described with reference to FIG. 6G. In one example, a tensor descriptor 660, 665 includes:

Data Layout Format 682: This field (e.g., byte 0) of the tensor descriptor specifies the data layout format. Valid data layout formats include, for instance (additional, fewer and/or other data layout formats are possible):

| Format | Description | Alignment (bytes) |
|---|---|---|
| 0 | 4D-feature tensor | 4096 |
| 1 | 4D-kernel tensor | 4096 |
| 2-255 | Reserved | — |

If an unsupported or reserved data layout format is specified, the response code of, e.g., 0010 hex, is stored in general register 0 and the instruction completes by setting condition code, e.g., 1.

Data Type 684: This field (e.g., byte 1) specifies the data type of the tensor. Examples of supported data types are described below (additional, fewer and/or other data types are possible):

| Value | Data Type | Data Size (bits) |
|---|---|---|
| 0 | NNP data-type-1 | 16 |
| 1-255 | Reserved | — |

If an unsupported or reserved data type is specified, a response code of, e.g., 0011 hex is stored in general register 0 and the instruction completes by setting condition code, e.g., 1.

Dimension 1-4 Index Size 686: Collectively, dimension index sizes one through four specify the shape of a 4D tensor. Each dimension index size is to be greater than zero and less than or equal to the maximum dimension index size (640, FIG. 6E); otherwise, a response code of, e.g., 0012 hex is stored in general register 0 and the instruction completes by setting condition code, e.g., 1. The total tensor size is to be less than or equal to the maximum tensor size (642, FIG. 6E); otherwise, a response code, e.g., 0013 hex is stored in general register 0 and the instruction completes by setting condition code, e.g., 1.

In one example, to determine the number of bytes in a 4D-feature tensor with elements of NNPA-data-type-1 (i.e., total tensor size), the following is used: dimension-index-4*dimension-index-3*ceil (dimension-index-2/32)*32*ceil (dimension-index-1/64)*64*2.

Tensor Address 688: This field (e.g., bytes 24-31) of the tensor descriptor includes a logical address of the leftmost byte of the tensor. The address is subject to the current addressing mode.

If the address is not aligned on the boundary of the associated data layout format, a response code of, e.g., 0014 hex, is stored in general register 0 and the instruction completes by setting condition code, e.g., 1.

In the access register mode, access register 1 specifies the address space containing all active input and output tensors in storage.

Returning to FIG. 6F, parameter block 650 further includes, in one example, function-specific-parameters 1-5 (670), which may be used by specific functions. Further, parameter block 650 includes, in one example, a continuation state buffer field 675, which includes data (or a location of data) to be used if operation of this instruction is to be resumed.

As an input to the operation, reserved fields of the parameter block should contain zeros. When the operation ends, reserved fields may be stored as zeros or remain unchanged.

Although one example of a parameter block for a non-query function is described with reference to FIG. 6F, other formats of a parameter block for a non-query function, including a non-query function of the Neural Network Processing Assist instruction, may be used. The format may depend, in one example, on the type of function to be performed. Further, although one example of a tensor descriptor is described with reference to FIG. 6G, other formats may be used. Further, different formats for input and output tensors may be used. Other variations are possible.

Further details regarding one or more functions supported by one embodiment of the Neural Network Processing Assist instruction are described below:

Function Code 0: NNPA-QAF (Query Available Functions)

The Neural Network Processing Assist (NNPA) query function provides a mechanism to indicate selected information, such as, for instance, the availability of installed functions, installed parameter block formats, installed data types, installed data layout formats, maximum dimension index size and maximum tensor size. The information is obtained and placed in a selected location, such as a parameter block (e.g., parameter block 630). When the operation ends, reserved fields of the parameter block may be stored as zeros or may remain unchanged.

In execution of one embodiment of the query function, a processor, such as general-purpose processor 13, obtains information relating to a specific processor, such as a specific model of a neural network processor, such as neural network processor 31. The obtained information is placed in a parameter block (e.g., parameter block 630) or other structure that is accessible to and/or for use with one or more applications that may use this information in further processing. In one example, the parameter block and/or information of the parameter block is maintained in memory. In other embodiments, the parameter block and/or information may be maintained in one or more hardware registers. As another example, the query function may be a privileged operation executed by the operating system, which makes available an application programming interface to make this information available to the application or non-privileged program. In yet a further example, the query function is performed by a special-purpose processor, such as neural network processor 31. Other variations are possible.

The information is obtained, e.g., by the firmware of the processor executing the query function. The firmware has knowledge of the attributes of the specific model of the specific processor (e.g., neural network processor). This information may be stored in, e.g., a control block, register and/or memory and/or otherwise be accessible to the processor executing the query function.

The obtained information includes, for instance, model-dependent detailed information regarding at least one or more data attributes of the specific processor, including, for instance, one or more installed or supported data types, one or more installed or supported data layout formats and/or one or more installed or supported data sizes of the selected model of the specific processor. This information is model-dependent in that other models (e.g., previous models and/or future models) may not support the same data attributes, such as the same data types, data sizes and/or data layout formats. When execution of the query function (e.g., NNPA-QAF function) completes, condition code 0, as an example, is set. Condition codes 1, 2 and 3 are not applicable to the query function, in one example. Further information relating to the obtained information is described below.

In one example, the query function obtains an indication of the data types installed on the model-dependent processor and places the indication in the parameter block by, e.g., setting one or more bits in installed data types field 636 of parameter block 630. One data type that may be installed is the NNP-data-type-1 data type, an example of which is described above. Although the NNP-data-type-1 data type is supported in one example, other model-dependent, specialized or non-standard data types may be supported, as well as one or more standard data types. A data type to be supported may have one or more assigned bits in the query parameter block (e.g., in installed data types field 636). For instance, machine-specific or non-standard data types supported by a particular processor are indicated in the installed data types field but standard data types are not indicated. In other embodiments, one or more standard data types are also indicated. Other variations are possible.

In one particular example, bit 0 of installed data types field 636 is reserved for the NNP-data-type-1 data type, and when it is set to, e.g., 1, it indicates that the processor supports NNP-data-type-1. As an example, the bit vector of installed data types is configured to represent up to 16 data types, in which a bit is assigned to each data type. However, a bit vector in other embodiments may support more or fewer data types. Further, a vector may be configured in which one or more bits are assigned to a data type. Many examples are possible and/or additional, fewer and/or other data types may be supported and/or indicated in the vector.

Further, in one example, the query function obtains an indication of installed data layout formats (another data attribute) and places the information in the parameter block by, e.g., setting one or more bits in installed data layout formats field 638. Example data layout formats include, for instance, a 4D-feature tensor layout and a 4D-kernel tensor layout. The 4D-feature tensor layout is used, in one example, by the functions indicated herein, and in one example, the convolution function uses the 4D-kernel tensor layout. These data layout formats arrange data in storage for a tensor in a way that increases processing efficiency in execution of the functions of the Neural Network Processing Assist instruction. For instance, to operate efficiently, the Neural Network Processing Assist instruction uses input tensors provided in particular data layout formats. Although example layouts are provided, additional, fewer and/or other layouts may be provided for the functions described herein and/or other functions.

The use or availability of layouts for a particular processor model is provided by the vector of installed data layout formats (e.g., field 638 of parameter block 630). The vector is, for instance, a bit vector of installed data layout formats that allows the CPU to convey to applications which layouts are supported. For instance, bit 0 is reserved for the 4D-feature tensor layout, and when it is set to, e.g., 1, it indicates that the processor supports a 4D-feature tensor layout; and bit 1 is reserved for the 4D-kernel tensor layout, and when it is set to, e.g., 1, it indicates that the processor supports a 4D-kernel tensor layout. In one example, the bit vector of installed data layout formats is configured to represent up to 16 data layouts, in which a bit is assigned to each data layout. However, a bit vector in other embodiments may support more or fewer data layouts. Further, a vector may be configured in which one or more bits are assigned to data layouts. Many examples are possible. Further details regarding the 4D-feature tensor layout and the 4D-kernel tensor layout are described below. Again, other layouts may be used now or in the future to optimize performance.

In one example, the Neural Network Processing Assist instruction operates with 4D-tensors, i.e., tensors with 4 dimensions. These 4D-tensors are obtained from generic input tensors described herein in, e.g., row-major, i.e., when enumerating the tensor elements in increasing memory address order, the inner dimension called E1 will be stepped up first through the E1-index-size values starting with 0 through the E1-index-size−1, before the index of the E2 dimension will be increased and the stepping through the E1 dimension is repeated. The index of the outer dimension called the E4 dimension is increased last.

Tensors that have a lower number of dimensions (e.g., 3D- or 1D-tensors) will be represented as 4D-tensors with one or more dimensions of the 4D-tensor exceeding the original tensor dimensions set to 1.

The transformation of a row-major generic 4D-tensor with dimensions E4, E3, E2, E1 into a 4D-feature tensor layout (also referred to herein as NNPA data layout format 0 4D-feature tensor) is described herein:

A resulting tensor can be represented, for instance, as a 4D-tensor of, e.g., 64-element vectors or a 5D-tensor with dimensions:

E4, ⌈E1/64⌉, E3, ⌈E2/32⌉*32, 64, where ⌈ ⌉ refers to a ceil function. (Stated another way: E4*E3*ceil (E2/32) *32*ceil (E1/64)*64 elements.)

An element [e4][e3][e2][e1] of the generic tensor may be mapped to the following element of the resulting 5D-tensor:

[e4] [⌊e1/64⌋][e3][e2][e1 MOD 64], where ⌊ ⌋ is a floor function and mod is modulo. (Stated another way: element (E3*e2_limit*e1_limit*e4x)+ (e2_limit*e3x*64)+(e2x*64)+(⌊e1x/ 64⌋*e2_limit*E3*64)+(e1x mod 64), where e2_limit=⌈E2/32⌉*32 and e1_limit=⌈E1/64⌉*64.)

The resulting tensor may be larger than the generic tensor. Elements of the resulting tensor with no corresponding elements in the generic tensor are called pad elements.

Consider the element [fe4][fe1][fe3][fe2][fe0] of a NNPA data layout format 0 4D-feature tensor of a 64-element vector or its equivalent representation as a 5D-tensor of elements. This element is either a pad element or its corresponding element in the generic 4D tensor with dimensions E4, E3, E2, E1 can be determined with the following formula:

if fe2≥E2 then this is an E2 (or page)-pad element
else if fe1*64+fe0≥E1 then this is an E1 (or row)-pad element
else corresponding element in generic 4D tensor is:
[fe4][fe3][fe2][fe1*64+fe0]

For convolutional neural network based artificial intelligence models, the meaning of the 4 dimensions of a feature tensor can generally be mapped to:

E4: N—Size of mini-batch
E3: H—Height of the 3D-tensor/image
E2: W—Width of the 3D-tensor/image
E1: C—Channels or classes of the 3D-tensor For machine learning or recurrent neural network based artificial intelligence models, the meaning of the 4 dimensions of a 4D-feature tensor may generally be mapped to:

E4: T—Number of time-steps or models
E3: Reserved, generally set to 1
E2: $N_{mb}$—Minibatch size
E1: L—Features The NNPA data layout format 0 provides, e.g., two dimensional data locality with 4 k-Bytes blocks of data (pages) as well as 4 k-Byte block data alignment for the outer dimensions of the generated tensor.

Pad element bytes are ignored for the input tensors and unpredictable for output tensors. PER storage-alteration on pad bytes is unpredictable.

One example of an input data layout for a 4D-feature tensor layout, which has dimensions E1, E2, E3 and E4, is shown in FIGS. 7A-7C, and an example output for the 4D-feature tensor layout is depicted in FIGS. 8A-8C. Referring to FIG. 7A, a 3D-tensor 700 is shown, which has dimensions E1, E2 and E3. In one example, each 3D-tensor includes a plurality of 2D-tensors 702. The numbers in each 2D-tensor 702 describe memory offsets of where each of its elements would be in memory. The inputs are used to lay-out the data of the original tensor (e.g., original 4D-tensor of FIGS. 7A-7C) in memory, as shown in FIGS. 8A-8C, which correspond to FIGS. 7A-7C.

In FIG. 8A, as an example, a unit of memory 800 (e.g., a memory page) includes a pre-selected number (e.g., 32) of rows 802, each of which is identified by, e.g., e2_page_idx; and each row has a pre-selected number (e.g., 64) of elements 804, each identified by, e.g., e1_page_idx. If a row does not include the pre-selected number of elements, it is padded 806, referred to as row or E1 padding; and if the memory unit does not have a pre-selected number of rows, it is padded 808, referred to as page or E2 padding. As examples, the row padding is, e.g., a pre-specified value, such as zeros or spaces, etc., and the page padding is, e.g., unpredictable data, existing values, any value, etc.

In one example, output elements of a row are provided in memory (e.g., in a page) based on element positions in the E1 direction of its corresponding input. For instance, referring to FIG. 7A, element positions 0, 1 and 2 of the three matrices shown (e.g., element positions at a same location in each matrix) are shown in row 0 of page 0 of FIG. 8A, etc. In this example, the 4D-tensor is small and all of the elements of each 2D-tensor representing the 4D-tensor fits in one page. However, this is only one example. A 2D-tensor may include one or more pages. If a 2D-tensor is created based on a reformatting of a 4D-tensor, then the number of pages of the 2D-tensor is based on the size of the 4D-tensor. In one example, one or more ceil functions are used to determine the number of rows in a 2D-tensor and the number of elements in each row, which will indicate how many pages are to be used. Other variations are possible.

In addition to the 4D-feature tensor layout, in one example, a neural network processor may support a 4D-kernel tensor layout, which re-arranges the elements of a 4D-tensor to reduce the number of memory accesses and data gathering steps when executing certain artificial intelligence (e.g., neural network processing assist) operations, such as a convolution. As an example, a row-major generic 4D-tensor with dimensions E4, E3, E2, E1 is transformed into a NNPA data layout format 1 4D-kernel tensor (4D-kernel tensor), as described herein:

A resulting tensor can be represented as a 4D-tensor of, e.g., 64-element vectors or a 5D-tensor with dimensions:

⌈E1/64⌉, E4, E3, ⌈E2/32⌉*32, 64, where ⌈ ⌉ refers to a ceil function. (Stated another way: E4*E3*ceil (E2/32)*32*ceil (E1/64)*64 elements.)

An element [e4][e3][e2[e1] of the generic tensor may be mapped to the following element of the resulting 5D-tensor:

[⌊e1/64⌋][e4][e3][e2][e1 MOD 64], where ⌊ ⌋ refers to a floor function and mod is modulo. Stated another way: element (⌊e1x/64⌋*E4*E3*e2_limit*64)+ (e4x*E3*e2_limit*64)+(e3x*e2_limit*64)+(e2x*64)+(e1x mod 64), where e2_limit=⌈E2/32⌉*32 and e1_limit=⌈E1/ 64⌉*64.

The resulting tensor may be larger than the generic tensor. Elements of the resulting tensor with no corresponding elements in the generic tensor are called pad elements.

Consider the element [fe1][fe4][fe3][fe2][fe0] of a NNPA data layout format 1 4D-feature tensor of 64-element vectors or its equivalent representation as a 5D-tensor of elements. This element is either a pad element or its corresponding element in the generic 4D tensor with dimensions E4, E3, E2, E1 can be determined with the following formula:

if fe2≥E2 then this is an E2 (or page)-pad element
else if fe1*64+fe0≥E1 then this is an E1 (or row)-pad element else corresponding element in generic 4D tensor is [fe4][fe3][fe2][fe1*64+fe0]

For convolutional neural network based artificial intelligence models, the meaning of the 4 dimensions of a kernel tensor can generally be mapped to:

E4: H—Height of the 3D-tensor/image
E3: W—Width of the 3D-tensor/image
E2: C—Number of Channels of the 3D-tensor
E1: K—Number of Kernels The NNPA data layout format 1 provides, e.g., two dimensional kernel parallelism within 4 k-Byte blocks of data (pages) as well as 4 k-Byte block data alignment for the outer dimensions of the generate tensor for efficient processing.

Pad bytes are ignored for the input tensors. PER storage-alteration on pad bytes is unpredictable.

Again, although example data layout formats include a 4D-feature tensor layout and a 4D-kernel tensor layout, other data layout formats may be supported by the processor (e.g., neural network processor 31). An indication of supported data layouts is obtained and placed in the query parameter block by setting one or more bits in, e.g., field 638.

The query parameter block also includes, in accordance with one or more aspects of the present invention, other data attribute information, which includes, e.g., supported size information for the data. A processor, such as a neural network processor, typically has limitations based on internal buffer sizes, processing units, data bus structures, firmware limitations, etc. that can limit the maximum size of tensor dimensions and/or the overall size of a tensor. Therefore, the query function provides fields to convey these limits to applications. For instance, the processor, based on executing the query function, obtains various data sizes, such as a maximum dimension index size (e.g., 65,536 elements) and a maximum tensor size (e.g., 8 GB), and includes this information in fields 640 and 642, respectively, of the parameter block (e.g., parameter block 630). Additional, fewer and/or other size information may also be supported by the processor (e.g., neural network processor 31), and thus, obtained and placed in the parameter block, e.g., fields 640, 642 and/or other fields. In other embodiments, the limitations could be smaller or larger, and/or the sizes may be in other units, such as bytes instead of elements, elements instead of bytes, etc. Further, other embodiments allow for different maximum sizes of each dimension, rather than the same maximum for all dimensions. Many variations are possible.

In accordance with one or more aspects of the present invention, a query function is provided that conveys detailed information relating to a specific model of a selected processor (e.g., neural network processor 31). The detailed information includes, for instance, model-dependent information relating to a specific processor. (A processor may also support standard data attributes, such as standard data types, standard data layouts, etc., which are implied and not necessarily presented by the query function; although, in other embodiments, the query function may indicate all or various selected subsets of data attributes, etc.) Although example information is provided, other information may be provided in other embodiments. The obtained information, which may be different for different models of a processor and/or of different processors, is used to perform artificial intelligence and/or other processing. The artificial intelligence and/or other processing may employ one or more non-query functions of, e.g., the Neural Network Processing Assist instruction. A specific non-query function employed in the processing is performed by executing the Neural Network Processing Assist instruction one or more times and specifying the non-query specific function.

As indicated by the query function, example non-query functions supported by the Neural Network Processing Assist instruction include NNPA-ADD (Addition), NNPA-SUB (Subtraction), NNPA-MUL (Multiplication), NNPA-DIV (Division), NNPA-MIN (Minimum), NNPA-MAX (Maximum), NNPA-LOG (Logarithm), NNPA-EXP (Exponent), NNPA-RELU (Rectified Linear unit), NNPA-TANH, NNPA-SIGMOID, NNPA-SOFTMAX, NNPA-BATCHNORM (Batch Normalization), NNPA-MAXPOOL2D, NNPA-AVGPOOL2D, NNPA-LSTMACT (Long Short-Term Memory Activation), NNPA-GRUACT (Gated Recurrent Unit Activation), NNPA-CONVOLUTION, NNPA-MATMUL-OP (Matrix Multiplication Operation), and NNPA-MATMUL-OP-BCAST23 (Matrix Multiplication Operation Broadcast 23). Additional, fewer and/or other functions may also be supported.

One or more of the functions is executed by a processor, such as neural network processor 31. For instance, the Neural Network Processing Assist instruction specifying a particular function to be performed is initiated by a general-purpose processor (e.g., processor 13) and if the function specified by the instruction is a non-query function, information is provided by the general-purpose processor to, e.g., a neural network processor (e.g., neural network processor 31) to allow the neural network processor to perform the function. The information includes, for instance, an indication of the function to be performed and/or one or more addresses of input data (e.g., input tensor data) for the function. In one example, the input data has been converted from, e.g., a standard format, such as a binary floating-point format, to a non-standard format, such as a machine-specific format (e.g., NNP-data-type-1) used by, for instance, neural network processor 31. The function is performed using the input data and produces an output (e.g., output tensor data) in the machine-specific format. That data (or a location of the data) is then provided to another processor (e.g., general processor 13) for conversion back to the standard format. The output data in the standard format may then be used in other processing. In other examples, the instructions may be initiated, executed and completed on one or more general-purpose processors or one or more special-purpose processors. Other variations are possible.

Further details regarding an example non-query function supported by the Neural Network Processing Instruction and performed by, e.g., neural network processor 31, are described below (additional, fewer and/or other functions may be supported in other embodiments):

Function Code 16: NNPA-ADD (Addition)

When the NNPA-ADD function is specified, each element of the input tensor 1 described by tensor descriptor 1 is added to the corresponding element of the input tensor 2 described by tensor descriptor 2, and the resulting sum is placed in the corresponding element of the output tensor described by the output tensor descriptor.

In one example, if the specified data layout in any of the specified tensor descriptors does not specify a 4-D feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Although the NPPA-ADD function is provided as one example, other and/or additional functions may be specified, as described herein.

For the Neural Network Processing Assist instruction, in one embodiment, if the output tensor overlaps with any input tensor or the parameter block, results are unpredictable.

A specification exception is recognized when execution of the Neural Network Processing Assist instruction is attempted and the parameter block is not designated on, e.g., a doubleword boundary, as an example.

A general operand data exception is recognized when execution of the Neural Network Processing Assist instruction is attempted and there are, for instance, tensor descriptor inconsistencies.

Resulting Condition Codes for the Neural Network Processing Assist instruction include, for instance: 0—Normal completion; 1—Response code is set; 2--; 3—CPU—determined amount of data processed.

In one embodiment, the priority of execution for the Neural Network Processing Assist instruction includes, for instance:

1-7. Exceptions with the same priority as the priority of program interruption conditions for the general case.
8.A Condition code 1 due to an unassigned or uninstalled function code specified.
8.B Specification exception due to parameter block not designated on doubleword boundary.
9. Access exceptions for an access to the parameter block.
10. Condition code 1 due to specified format of the parameter block not supported by the model.
11.A Condition code 1 due to the specified tensor data layouts are not supported.
11.B General operand data exception due to differing data layouts between tensor descriptors.
12.A Condition code 1 due to conditions other than those included in items 8.A, 10 and 11.A above and 12.B.1 below.
12.B.1 Condition code 1 due to invalid output tensor data type for NNPA-RELU and NNPA-CONVOLUTION.
12.B.2 General operand data exception for invalid value for NNPA-RELU function-specific-parameter-1 and NNPA-CONVOLUTION function-specific-parameter-4.
13.A Access exceptions for an access to the output tensor.
13.B Access exceptions for an access to the input tensors.
13.C Access exceptions for an access to the function-specific-save-area.
14. Condition code 0.

As described herein, in one or more aspects, a capability is provided to detect invalid data types during, for instance, a conversion operation in which an invalid indicator is not checked until the end of the conversion operation (e.g., after a plurality (e.g., many) conversion actions are performed). As an example, by checking an indicator at the end of a conversion operation that includes a plurality of conversion actions, performance of the conversion operation is improved, further improving the performance of, for instance, processing within a computing environment. This includes, in one example, improving processing associated with live migration of virtual machines which may be executing workloads in which a conversion operation may be employed.

In one example, by setting an indicator that is checked subsequent to the conversion operation, rather than taking an exception or checking a condition code after each individual conversion action, branching or exception checking after each conversion action of the conversion operation is avoided, thereby, improving system performance.

As an example, the conversion is to/from a machine-specific data type in which the data type is optimized for use by a particular processor running on a particular hardware machine. For instance, machine-specific data type may preserve enhanced accuracy and/or be easier for the machine to implement. One example of a machine-specific data type is the NNP-data-type-1 data type used by a model of the neural network processor. As an example, the Neural Network Processing Assist instruction operates on the machine-specific data type (also referred to as an internal data type) to represent the input/output data for greater efficiency. Thus, the input/output data is converted from a standard format (e.g., IEEE 754 binary floating point, etc.) to the machine-specific format available on the machine (e.g., NNP-data-type-1). The machine-specific data type may vary from machine model to machine model in order to optimize for new and/or other processor architectures.

One or more aspects of the present invention are inextricably tied to computer technology and facilitate processing within a computer, improving performance thereof. In one or more aspects, a conversion operation is provided that facilitates data conversion, data type invalidity checking, data migration and/or migration of virtual machines, improving system performance and reducing use of system resources. The converted data, instruction(s) used to perform the conversion actions, instructions to use the data and/or migration processing may be used in many technical fields, such as in computer processing, medical processing, engineering, automotive technologies, manufacturing, etc. By providing optimizations in converting, invalidity checking and/or migrating the data, these technical fields are improved by, e.g., reducing execution time.

Further details of one or more embodiments of facilitating processing within a computing environment, as it relates to one or more aspects of the present invention, are described with reference to FIGS. 9A-9B.

Referring to FIG. 9A, in one embodiment, a conversion operation is performed to convert workload data of one or more data types to one or more other data types 900. The performing the conversion operation includes performing a plurality of conversion actions 902. A conversion action of the plurality of conversion actions includes, for instance, processing an instruction to convert selected data from a source data type to a target data type 904. The processing the instruction includes, for instance, determining whether a data type indicated using the instruction is a valid data type for a select machine 906. The data type being a selected data type selected from the source data type or the target data type 907. The selected data is converted from the source data type to the target data type, based on determining that the data type is a valid data type for the select machine 908. An indicator is set to a select value to indicate the data type is an invalid data type for the select machine, based on determining that the data type is an invalid data type for the select machine 910. The indicator to be checked at an end of the conversion operation 912.

By checking the indicator at the end of a conversion operation that includes a plurality of conversion actions, performance of the conversion operation is improved, further improving system performance and/or the performance of, for instance, the conversion operation.

In one embodiment, the indicator is checked at the end of the conversion operation to determine whether one or more processed instructions specified an invalid data type 914.

Referring to FIG. 9B, in one embodiment, the performing the conversion operation includes setting the indicator to an initial value at a beginning of the conversion operation prior to performing the plurality of conversion actions 920 and checking the indicator at an end of the plurality of conversion actions to determine whether one or more instructions specified an invalid data type 922.

By setting an indicator that is checked subsequent to the conversion operation, rather than taking an exception or checking a condition code after each individual conversion action, branching or exception checking after each conversion action of the conversion operation is avoided.

In one example, the determining further includes determining whether another data type of the source data type or the target data type is valid for the select machine 924. The converting the selected data is performed based on the source data type and the target data type being valid data types for the select machine 926, and the indicator is set to the select value based on either the source data type or the target data type being an invalid data type for the select machine 928.

In one example, the determining further includes determining whether another data type of the source data type or the target data type is valid for the select machine 930. The converting the selected data is performed based on the source data type and the target data type being valid data types for the select machine 932. The indicator is set to the select value based on the selected data type being invalid for the select machine and is not set based on the other data type being invalid for the select machine 934.

As an example, the processing the instruction further includes providing an exception based on the other data type being invalid for the select machine 936.

In one embodiment, the processing the instruction includes providing a default response based on setting the indicator to the select value to indicate the data type is an invalid data type for the select machine 940.

As an example, the workload is of a virtual machine migrated from one machine to the select machine 942. The setting of the indicator is, for instance, a detection of a change in underlying hardware of the select machine 944.

In one example, the data type includes a machine-specific data type for the select machine 950. The machine-specific data type is specified by the source data type or the target data type based on the instruction being processed 952.

Other variations and embodiments are possible.

Figure 10:
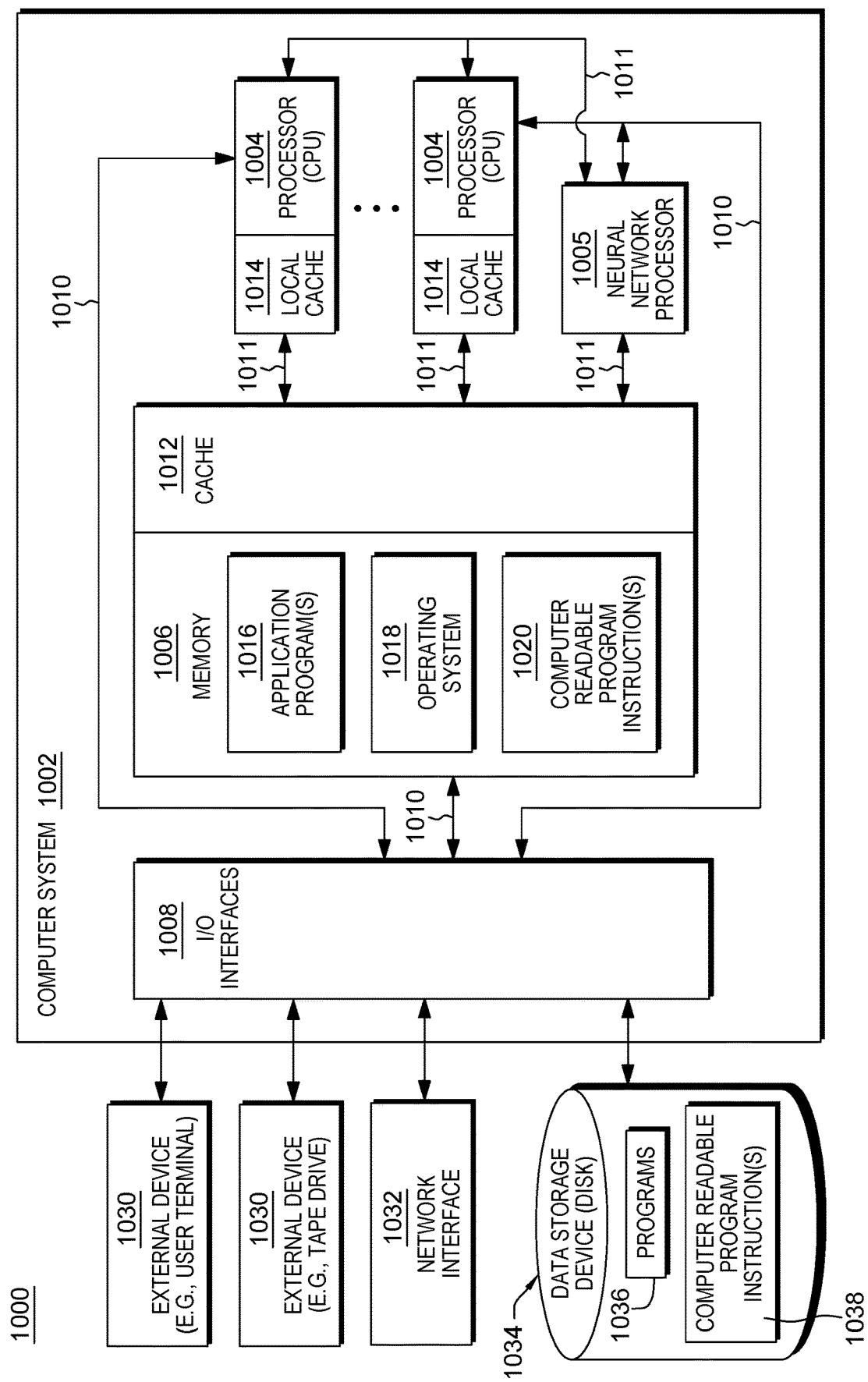
FIG. 10 depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 10. As an example, the computing environment of FIG. 10 is based on the z/Architecture® instruction set architecture offered by International Business Machines Corporation, Armonk, N.Y. The z/Architecture instruction set architecture, however, is only one example architecture. Again, the computing environment may be based on other architectures, including, but not limited to, the Intel® x86 architectures, other architectures of International Business Machines Corporation, and/or other architectures of other companies. Intel is a trademark or registered trademark of Intel Corporation or its subsidiaries in the United States and other countries.

Referring to FIG. 10, in one example, a computing environment 1000 includes, for instance, a computer system 1002 shown, e.g., in the form of a general-purpose computing device. Computer system 1002 may include, but is not limited to, one or more general-processors or processing units 1004 (e.g., central processing units (CPUs)), at least one special-purpose processor, such as a neural network processor 1005, a memory 1006 (a.k.a., system memory, main memory, main storage, central storage or storage, as examples), and one or more input/output (I/O) interfaces 1008, coupled to one another via one or more buses and/or other connections. For instance, processors 1004, 1005 and memory 1006 are coupled to I/O interfaces 1008 via one or more buses 1010, and processors 1004, 1005 are coupled to one another via one or more buses 1011.

Bus 1011 is, for instance, a memory or cache coherence bus, and bus 1010 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special-purpose processors (e.g., neural network processors) may be separate from but coupled to one or more general-purpose processors and/or may be embedded within one or more general-purpose processors. Many variations are possible.

Memory 1006 may include, for instance, a cache 1012, such as a shared cache, which may be coupled to local caches 1014 of processors 1004 and/or to neural network processor 1005, via, e.g., one or more buses 1011. Further, memory 1006 may include one or more programs or applications 1016 and at least one operating system 1018. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 1006 may also include one or more computer readable program instructions 1020, which may be configured to carry out functions of embodiments of aspects of the invention.

Computer system 1002 may communicate via, e.g., I/O interfaces 1008 with one or more external devices 1030, such as a user terminal, a tape drive, a pointing device, a display, and one or more data storage devices 1034, etc. A data storage device 1034 may store one or more programs 1036, one or more computer readable program instructions 1038, and/or data, etc. The computer readable program instructions may be configured to carry out functions of embodiments of aspects of the invention.

Computer system 1002 may also communicate via, e.g., I/O interfaces 1008 with network interface 1032, which enables computer system 1002 to communicate with one or more networks, such as a local area network (LAN), a general wide area network (WAN), and/or a public network (e.g., the Internet), providing communication with other computing devices or systems.

Computer system 1002 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 1002. Examples, include, but are not limited to: microcode or millicode, device drivers, redundant processing units, external disk drive arrays, RAID systems, tape drives, and data archival storage systems, etc.

Computer system 1002 may be operational with numerous other general-purpose or special-purpose computing system environments or configurations. Examples of well-known computing systems, environments, and/or configurations that may be suitable for use with computer system 1002 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 11A:
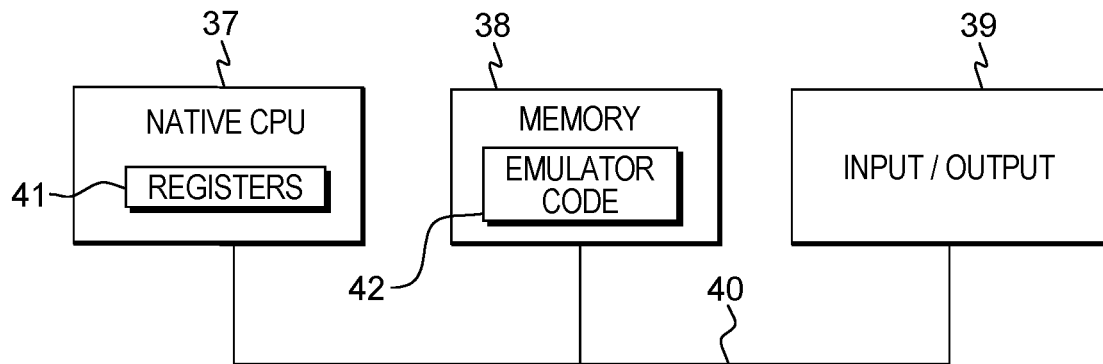
FIG. 11A depicts yet another example of a computing environment to incorporate and use one or more aspects of the present invention.

Another embodiment of a computing environment to incorporate and use one or more aspects of the present invention is described with reference to FIG. 11A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 11B:
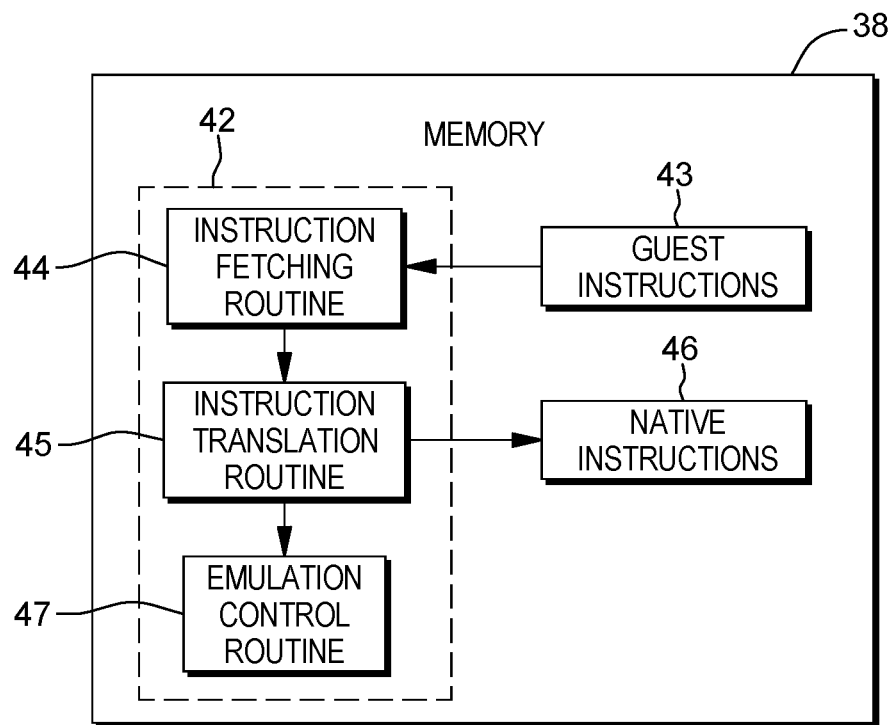
FIG. 11B depicts further details of the memory of FIG. 11A, in accordance with one or more aspects of the present invention.

Further details relating to emulator code 42 are described with reference to FIG. 11B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

Example instructions that may be emulated are the Vector Floating Point Convert and Lengthen From Neural Network Processing High instruction, Vector Floating Point Convert and Lengthen From Neural Network Processing Low instruction, Vector Floating Point Convert and Round to Neural Network Processing instruction, Vector Floating Point Convert From Neural Network Processing instruction, Vector Floating Point Convert To Neural Network Processing instruction and/or the Neural Network Processing Assist instruction described herein, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
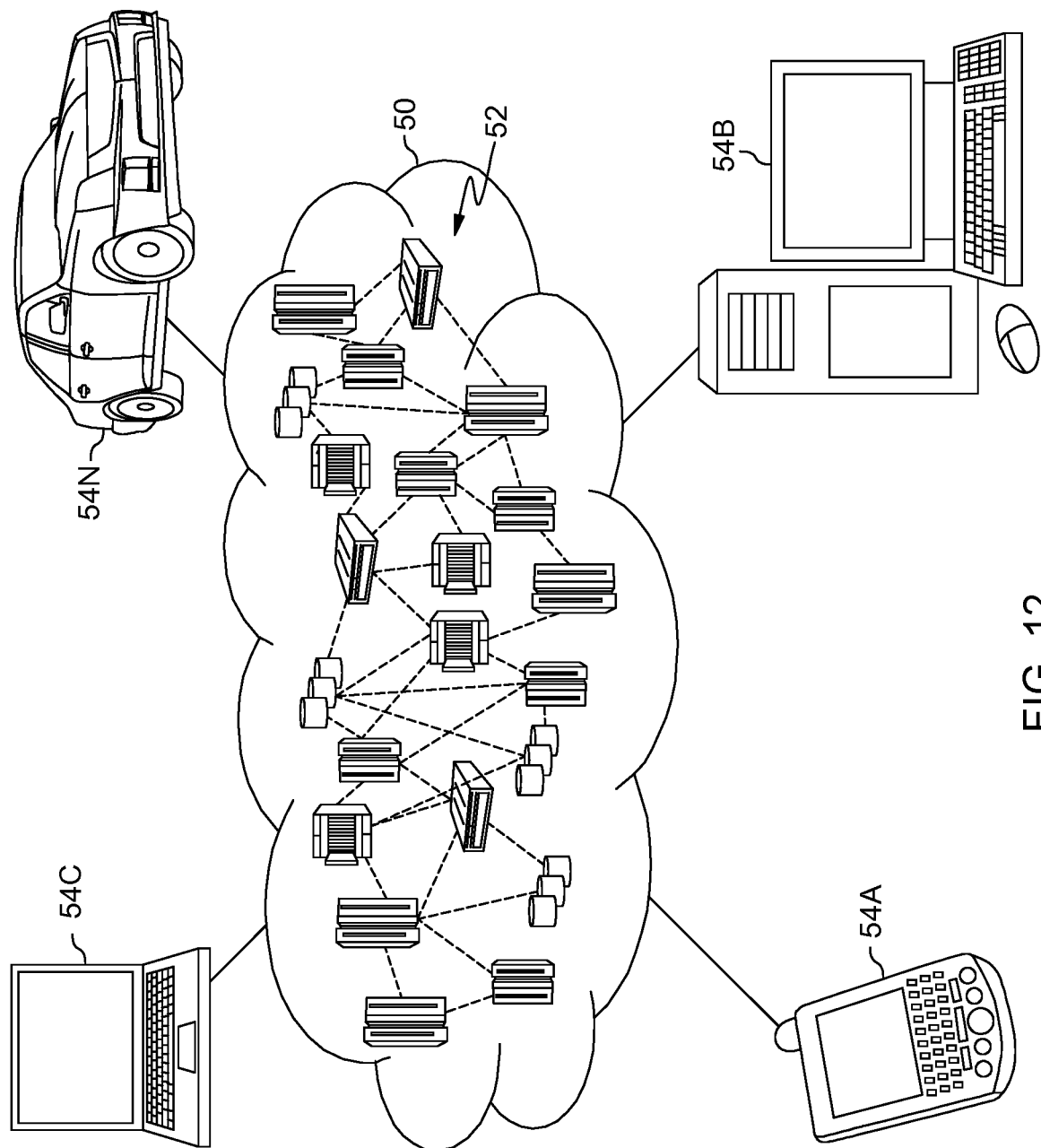
FIG. 12 depicts one embodiment of a cloud computing environment, in accordance with one or more aspects of the present invention.

Referring now to FIG. 12, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 13:
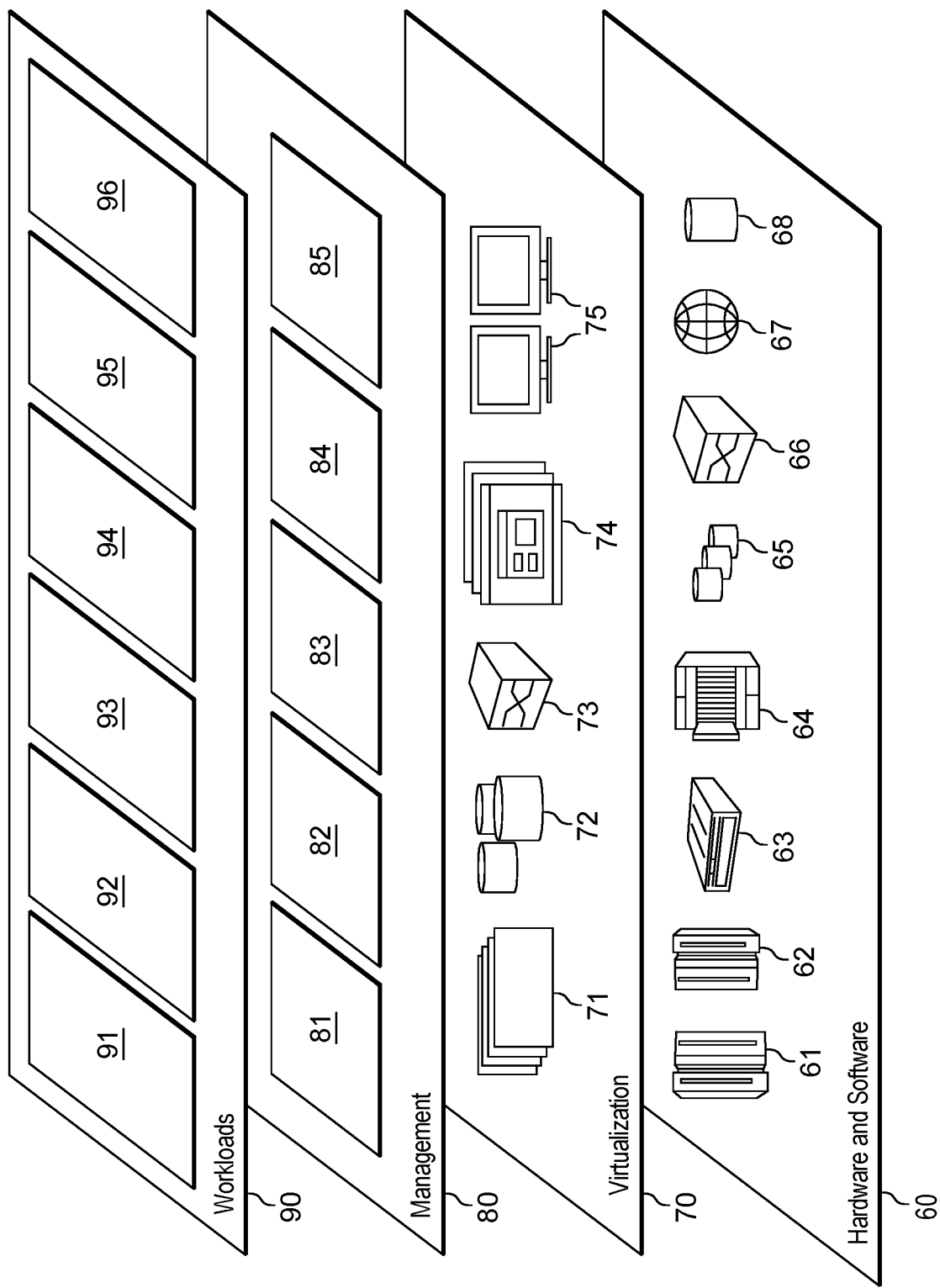
FIG. 13 depicts one example of abstraction model layers, in accordance with one or more aspects of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data type invalidity checking, conversion and/or neural network processing assist processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:

performing a conversion operation to convert workload data of one or more data types to one or more other data types, the performing the conversion operation comprising performing a plurality of conversion actions, wherein a conversion action of the plurality of conversion actions comprises:
  processing an instruction of an instruction set architecture, the instruction to be used to convert selected data from a source data type to a target data type, and wherein at least one of the source data type and the target data type is specified using the instruction, the processing the instruction comprising:
    determining based on at least decoding the instruction using a processor of the computing environment, that a data type indicated using the instruction is an invalid data type for a select machine, the data type being a selected data type selected from multiple data types, the multiple data types including the source data type and the target data type; and
    setting an indicator to a select value to indicate that the data type is the invalid data type for the select machine, based on determining that the data type is the invalid data type for the select machine, the indicator to be checked at an end of the conversion operation.

2. The computer program product of claim 1, wherein the method further comprises checking the indicator at the end of the conversion operation to determine whether one or more processed instructions specified the invalid data type.

3. The computer program product of claim 1, wherein the performing the conversion operation comprises:
  setting the indicator to an initial value at a beginning of the conversion operation prior to performing the plurality of conversion actions; and
  checking the indicator at an end of the plurality of conversion actions to determine whether one or more instructions specified the invalid data type.

4. The computer program product of claim 1, wherein the determining further comprises determining that another data type of the multiple data types is valid for the select machine, and wherein the indicator is set to the select value based on at least one data type of the multiple data types being the invalid data type for the select machine.

5. The computer program product of claim 1, wherein the determining further comprises determining that another data type of the multiple data types is invalid for the select machine, and wherein the indicator is set to the select value based on the selected data type being invalid for the select machine and is not set based on the other data type being invalid for the select machine.

6. The computer program product of claim 5, wherein the processing the instruction further includes providing an exception based on the other data type being invalid for the select machine.

7. The computer program product of claim 1, wherein the processing the instruction comprises providing a default response based on setting the indicator to the select value to indicate the data type is the invalid data type for the select machine.

8. The computer program product of claim 1, wherein the workload is of a virtual machine migrated from one machine to the select machine.

9. The computer program product of claim 1, wherein the setting of the indicator is a detection of a change in underlying hardware of the select machine.

10. The computer program product of claim 1, wherein the data type comprises a machine-specific data type for the select machine, the machine-specific data type being specified by a chosen data type selected from the multiple data types based on the instruction being processed.

11. A computer system for facilitating processing within a computing environment, the computer system comprising:
  a memory; and
  a processor in communication with the memory, wherein the computer system is configured to perform a method, said method comprising:
    processing an instruction of an instruction set architecture, the instruction to be used to convert selected data from a source data type to a target data type, and wherein at least one of the source data type and the target data type is specified using the instruction, the processing the instruction comprising:
      determining, based on at least decoding the instruction using a processor of the computing environment, that a data type indicated using the instruction is an invalid data type for a select machine, the data type being a selected data type selected from multiple data types, the multiple data types including the source data type and the target data type; and
      setting an indicator to a select value to indicate that the data type is the invalid data type for the select machine, based on determining that the data type is the invalid data type for the select machine, the indicator to be checked at an end of the conversion operation.

12. The computer system of claim 11, wherein the method further comprises checking the indicator at the end of the conversion operation to determine whether one or more processed instructions specified the invalid data type.

13. The computer system of claim 11, wherein the performing the conversion operation comprises:
  setting the indicator to an initial value at a beginning of the conversion operation prior to performing the plurality of conversion actions; and
  checking the indicator at an end of the plurality of conversion action to determine whether one or more instructions specified as the invalid data type.

14. The computer system of claim 11, wherein the determining further comprises determining whether another data type of the multiple data types is valid for the select machine, and wherein the indicator is set to the select value based on at least one data type of the multiple data types being the invalid data type for the select machine.

15. The computer system of claim 11, wherein the determining further comprises determining that another data type of the multiple data types is invalid for the select machine, and wherein the indicator is set to the select value based on the selected data type being invalid for the select machine and is not set based on the other data type being invalid for the select machine.

16. A computer-implemented method of facilitating processing within a computing environment, the computer-implemented method comprising:
  processing an instruction of an instruction set architecture, the instruction to be used to convert selected data from a source data type to a target data type, and wherein at least one of the source data type and the target data type is specified using the instruction, the processing the instruction comprising:
    determining, based on at least decoding the instruction using a processor of the computing environment, that a data type indicated using the instruction is an invalid data type for a select machine, the data type being a selected data type selected from multiple data types the multiple data types including the source data type and the target data type; and setting an indicator to a select value to indicate that the data type is the invalid data type for the select machine, based on determining that the data type is the invalid data type for the select machine, the indicator to be checked at an end of the conversion operation.

17. The computer-implemented method of claim 16, further comprising checking the indicator at the end of the conversion operation to determine whether one or more processed instructions specified the invalid data type.

18. The computer-implemented method of claim 16, wherein the performing the conversion operation comprises:
    setting the indicator to an initial value at a beginning of the conversion operation prior to performing the plurality of conversion actions; and
    checking the indicator at an end of the plurality of conversion actions to determine whether one or more instructions specified the invalid data type.

19. The computer-implemented method of claim 16, wherein the determining further comprises determining that another data type of the multiple data types is valid for the select machine, and wherein the indicator is set to the select value based on at least one data type of the multiple data types being the invalid data type for the select machine.

20. The computer-implemented method of claim 16, wherein the determining further comprises determining that another data type of the multiple data types is invalid for the select machine, and wherein the indicator is set to the select value based on the selected data type being invalid for the select machine and is not set based on the other data type being invalid for the select machine.

21. The computer program product of claim 1, wherein the method further comprises:
    performing another conversion action of the plurality of conversion actions, the performing the another conversion action comprising:
        processing a selected instruction to convert selected data from the source data type to the target data type, the processing the selected instruction comprising:
            determining that the data type indicated using the instruction is a valid data type for the select machine; and
            converting the selected data from the source data type to the target data type, based on determining that the data type is the valid data type for the select machine.

22. A computer program product for facilitating processing within a computing environment, the computer program product comprising:
    one or more computer readable storage media and program instructions collectively stored on the one or more computer readable storage media to perform a method comprising:
        performing a conversion operation to convert workload data of one or more data types to one or more other data types, the performing the conversion operation comprising performing a plurality of conversion actions, wherein a conversion action of the plurality of conversion actions comprises:
            processing an instruction to be used to convert selected data from a source data type to a target data type, the processing the instruction comprising:
                determining that a data type indicated using the instruction is an invalid data type for a select machine, the data type being a selected data type selected from multiple data types, the multiple data types including the source data type and the target data type;
                setting an indicator to a select value to indicate that the data type is the invalid data type for the select machine, based on determining that the data type is the invalid data type for the select machine, the indicator to be checked at an end of the conversion operation; and
                providing a default response based on setting the indicator to the select value to indicate the data type is the invalid data type for the select machine.

23. The computer system of claim 11, wherein the method further comprises:
    performing another conversion action of the plurality of conversion actions, the performing the another conversion action comprising:
        processing a selected instruction to convert selected data from the source data type to the target data type, the processing the selected instruction comprising:
            determining that the data type indicated using the instruction is a valid data type for the select machine; and
            converting the selected data from the source data type to the target data type, based on determining that the data type is the valid data type for the select machine.

24. The computer-implemented method of claim 16, further comprising:
    performing another conversion action of the plurality of conversion actions, the performing the another conversion action comprising:
        processing a selected instruction to convert selected data from the source data type to the target data type, the processing the selected instruction comprising:
            determining that the data type indicated using the instruction is a valid data type for the select machine; and
            converting the selected data from the source data type to the target data type, based on determining that the data type is the valid data type for the select machine.

25. A computer-implemented method of facilitating processing within a computing environment, the computer-implemented method comprising:
    performing a conversion operation to convert workload data of one or more data types to one or more other data types, the performing the conversion operation comprising performing a plurality of conversion actions, wherein a conversion action of the plurality of conversion actions comprises:
        processing an instruction to be used to convert selected data from a source data type to a target data type, the processing the instruction comprising:
            determining that a data type indicated using the instruction is an invalid data type for a select machine, the data type being a selected data type selected from multiple data types, the multiple data types including the source data type and the target data type; and setting an indicator to a select value to indicate that the data type is the invalid data type for the select machine, based on determining that the data type is the invalid data type for the select machine, the indicator to be checked at an end of the conversion operation, wherein the setting of the indicator is a detection of a change in underlying hardware of the select machine.

\* \* \* \* \*